United States Patent
Salman et al.

(10) Patent No.: US 11,960,984 B2
(45) Date of Patent: Apr. 16, 2024

(54) ACTIVE LEARNING FRAMEWORK FOR MACHINE-ASSISTED TASKS

(71) Applicant: SCHLUMBERGER TECHNOLOGY CORPORATION, Sugar Land, TX (US)

(72) Inventors: Nader Salman, Cambridge, MA (US); Guillaume Le Moing, Saint Martin (FR); Sepand Ossia, Cambridge, MA (US); Vahagn Hakopian, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 349 days.

(21) Appl. No.: 17/279,431

(22) PCT Filed: Sep. 24, 2019

(86) PCT No.: PCT/US2019/052642
§ 371 (c)(1),
(2) Date: Mar. 24, 2021

(87) PCT Pub. No.: WO2020/068784
PCT Pub. Date: Apr. 2, 2020

(65) Prior Publication Data
US 2021/0406644 A1 Dec. 30, 2021

Related U.S. Application Data

(60) Provisional application No. 62/872,609, filed on Jul. 10, 2019, provisional application No. 62/735,568, filed on Sep. 24, 2018.

(51) Int. Cl.
*G06N 3/04* (2023.01)
*G06N 3/045* (2023.01)
(Continued)

(52) U.S. Cl.
CPC ............. *G06N 3/047* (2023.01); *G06N 3/045* (2023.01); *G06N 3/08* (2013.01); *G06N 20/20* (2019.01)

(58) Field of Classification Search
CPC ........ G06N 20/10; G06N 20/20; G06N 3/045; G06N 3/047; G06N 3/08
See application file for complete search history.

(56) References Cited

U.S. PATENT DOCUMENTS 6,711,293 B1  3/2004  Lowe
8,379,154 B2  2/2013  Zhang
(Continued)

FOREIGN PATENT DOCUMENTS

EP  2672396 A1  12/2013
EP  3475881 A1  12/2019
(Continued)

OTHER PUBLICATIONS

Simonyan et al., "Very deep convolutional networks for large-scale image recognition", CoRR, abs/1409.1556, 2014 (14 pages).
(Continued)

*Primary Examiner* — Brent Johnston Hoover
(74) *Attorney, Agent, or Firm* — Jeffrey D. Frantz

(57) ABSTRACT

An active learning framework is provided that employs a plurality of machine learning components that operate over iterations of a training phase followed by an active learning phase. In each iteration of the training phase, the machine learning components are trained from a pool of labeled observations. In the active learning phase, the machine learning components are configured to generate metrics used to control sampling of unlabeled observations for labeling such that newly labeled observations are added to a pool of labeled observations for the next iteration of the training phase. The machine learning components can include an
(Continued)

inspection (or primary) learning component that generates a predicted label and uncertainty score for an unlabeled observation, and at least one additional component that generates a quality metric related to the unlabeled observation or the predicted label. The uncertainty score and quality metric(s) can be combined for efficient sampling of observations for labeling.

20 Claims, 24 Drawing Sheets

(51) Int. Cl.
  *G06N 3/047* (2023.01)
  *G06N 3/08* (2023.01)
  *G06N 20/20* (2019.01)

(56) References Cited

U.S. PATENT DOCUMENTS

| | | | |
|---|---|---|---|
| 2005/0021290 | A1 | 1/2005 | Velipasaoglu |
| 2009/0238460 | A1 | 9/2009 | Funayama et al. |
| 2012/0269436 | A1 | 10/2012 | Mensink et al. |
| 2013/0346356 | A1 | 12/2013 | Welinder et al. |
| 2014/0040169 | A1* | 2/2014 | Forman ............ G06N 20/00 706/12 |
| 2014/0229407 | A1* | 8/2014 | White ............ G06N 20/00 706/46 |
| 2014/0280238 | A1 | 9/2014 | Cormack et al. |
| 2016/0162802 | A1 | 6/2016 | Chickering et al. |
| 2017/0116544 | A1* | 4/2017 | Johnson ............ G06N 20/10 |
| 2017/0262635 | A1* | 9/2017 | Strauss ............ G06N 20/00 |
| 2018/0189610 | A1 | 7/2018 | Kandemir et al. |
| 2018/0240031 | A1 | 8/2018 | Huszar et al. |
| 2019/0325275 | A1* | 10/2019 | Lee ............ G06V 30/19167 |

FOREIGN PATENT DOCUMENTS

| | | | |
|---|---|---|---|
| WO | 1999/028767 | A1 | 6/1999 |
| WO | 2018/082790 | A1 | 5/2018 |
| WO | 2018/150812 | A1 | 8/2018 |
| WO | 2021007514 | A1 | 1/2021 |

OTHER PUBLICATIONS

Scholkopf et al., "Support vector method for novelty detection," Advances in Neural Information Processing Systems 12, pp. 582-588, 1999.
G.Csurka et al., Visual Categorization with Bags of Keypoints, 2004. (16 pages).
J.Yang et al., Evaluating Bag-of-Visual-Words Representations in Scene Classification, Proceedings of the international workshop on Workshop on multimedia information retrieval, 2007. (10 pages).
H.Bay et al., SURF: Speeded Up Robust Features, EECV 2006. (14 pages).
D. Lowe, Distinctive Image Features from Scale-Invariant Keypoints, International Journal of Computer Vision, 2004 (28 pages).
E.Rublee et al., ORB: An efficient alternative to SIFT or SURF, International Conference on Computer Vision, 2011. (8 pages).
D.Xu and Y.Tian, A Comprehensive Survey of Clustering Algorithms, Annals of Data Science, 2015. (29 pages).
Shannon. A Mathematical Theory of Communication. The Bell System Technical Journal, 1948 (55 pages).
G. Huang, and al. Snapshot ensembles: Train 1, get M for free. ICLR submission, 2017. (14 pages).
International Preliminary Report on patentability of the International Application PCT/US2020/041597 dated Jan. 20, 2022 (8 pages).
Settles. Active Learning Literature Survey. University of Wisconsin-Madison Department of Computer Sciences, 2010. (67 pages).
Houlsby et al. Bayesian Active Learning for Classification and Preference Learning. arXiv preprint, 2011. (17 pages).
Tong Active Learning: Theory and Applications. Stanford University, 2001. (201 pages).
Gal et al. Deep Bayesian Active Learning with Image Data. International Conference on Machine Learning, 2017. (10 pages).
Beluch et al. The Power of Ensembles for Active Learning in Image Classification. Conference on Computer Vision and Pattern Recognition, 2018. (10 pages).
Mazzoni et al. Active Learning with Irrelevant Examples. Proceedings of the Seventeenth European Conference on Machine Learning, 2006. (8 pages).
Bappy et al. The Impact of Typicality for Informative Representative Selection. Conference on Computer Vision and Pattern Recognition, 2017. (10 pages).
Kao et al. Localization-Aware Active Learning for Object Detection. arXiv preprint, 2017. (21 pages).
Rhee et al. Active and Semi-Supervised Learning for Object Detection with Imperfect Data. Cognitive Systems Research, 2017. (15 pages).
Xu et al. Representative Sampling for Text Classification Using Support Vector Machines. Proceedings of ECIR-03, 25th European conference on information retrieval, 2003 (15 pages).
Wang et al. Towards Human-Machine Cooperation: Self-supervised Sample Mining for Object Detection. Conference on Computer Vision and Pattern Recognition, 2018. (9 pages).
Konyushkova et al. Learning Intelligent Dialogs for Bounding Box Annotation. Conference on Computer Vision and Pattern Recognition, 2018. (10 pages).
Papadopoulos et al. We don't need no Bounding-Boxes: Training Object Class Detectors using only Human Verification. Conference on Computer Vision and Pattern Recognition, 2016. (10 pages).
Perera et al. Learning Deep Features for One-Class Classification_ 2018. (15 pages).
Lin et al. Focal Loss for Dense Object Detection. International Conference on Computer Vision, 2017. (9 pages).
Liu et al. SSD: Single Shot MultiBox Detector. Proceedings of the European Conference on Computer Vision, 2016. (15 pages).
Redmon et al. You Only Look Once: Unified, Real-Time Object Detection. Proceedings of the IEEE conference on computer vision and pattern recognition, 2016. (10 pages).
International Search Report and Written Opinion of the equivalent International Application PCT/US2019/052642 dated Jan. 23, 2020 (9 pages).
International Preliminary Report of the equivalent International Application PCT/US2019/052642 dated Apr. 1, 2021 (6 pages).
Settles et al. An analysis of active learning strategies for sequence labeling tasks. In Proceedings of the Conference on Empirical Methods in Natural Language Processing (EMNLP), pp. 1070-1079. 2008.
Huang et al. Snapshot ensembles: Train 1, get M for free. ICLR submission, 2017. (14pages).
International Search Report and Written Opinion of the Related International Application PCT/US2020/041597 dated Oct. 16, 2020 (10 pages).
Ferrier et al. An integrated GIS and knowledge-based system as an aid for the geological analysis of sedimentary basins_International Journal of Geographical Information Science, London vol. 11. no.3, Apr. 1, 1997, pp. 281-297 XP002098061.
Joint UK Project Developing Basin Geology Modeling Tool, Offshore, Pennwell, Tulsa, OK, US vol. 53 No.4, Apr. 1, 1993 pp. 86-87 XP000365016.
Zhao et al., Object Detection with Deep Learning: A Review, arXiv preprint, 2019_(21 pages).
Wu et al., Recent Advances in Deep Learning for Object Detection, arXiv preprint, 2019_(40 pages).
Redmon et al. You Only Look Once: Unified, Real-Time Object Detection. Proceedings of the IEEE conference on computer vision and pattern recognition, 2016.(22 pages).
Redmon J, Farhadi A. Yolov3: An incremental improvement. arXiv preprint arXiv:1804.02767. Apr. 8, 2018.(6pages).
A.Holub et al., Entropy-based Active Learning for Object Recognition, IEEE Computer Society Conference on Computer Vision and Pattern Recognition Workshops, 2008_(8 pages).

(56) References Cited

OTHER PUBLICATIONS

K.Wang et al., Cost-Effective Active Learning for Deep Image classification, TCSVT, 2016.(10 pages).
Brust et al._Active Learning for Deep Object Detection, International Conference on Computer Vision Theory and Applications, 2019.(11 pages).
Lewis et al_A Sequential Algorithm for Training Text Classifiers, SIGIR, 1994.
P.Melville and R.J. Mooney, Diverse Ensembles for Active Learning, ICML, 2004. 8 pages.
Settles et al_An Analysis of Active Learning Strategies for Sequence Labeling Tasks_2008_(10 pages).
Y.Guo and R.Greiner, Optimistic Active Learning using Mutual Information, IJCAI, 2007.
Sener et al., Active Learning for Convolutional Neural Networks: A Core-Set Approach, ICLR 2018_13 Pages.
X.Li and Y.Guo, Adaptive Active Learning for Image Classification, CVPR, 2013. (8 pages).
B.Demir and L. Bruzzone, A Novel Active Learning Method in Relevance Feedback for Content-Based Remote Sensing Image Retrieval, IEEE Transactions on Geoscience and Remote Sensing, 2015. (12 pages).
C.Vondrick and D.Ramanan, Video Annotation and Tracking with Active learning, NIPS, 2011. (9 pages).
A.Deshpende et al., Review of Keyframe Extraction Techniques for Video Summarization, International Journal of Computer Applications, 2018. (5 pages).
C.Costsaces et al., Video shot detection and condensed representation. a review, Signal Processing Magazine, 2008. (10 pages).
Zhao et al., Hierarchical Recurrent Neural Network for Video Summarization, 2019. (8 pages).
K.Zhang et al., Video Summarization with Long Short-Term Memory, ECCV, 2016. (17 pages).
G.Guan et al., Video Summarization with Global and Local Features, IEEE International Conference on Multimedia and Expo Workshops, 2012_(6 pages).
Sheena et al., Key-frame extraction by analysis of histograms of video frames using statistical methods, 2015_(5 pages).
Exam Report issued in United Kingdom Patent Application No. GB2200243.0 dated Mar. 13, 2023, 8 pages.
Substantive Exam and Search Report issued in Norway Patent Application No. 20220031 dated Oct. 26, 2023, 6 pages.

* cited by examiner

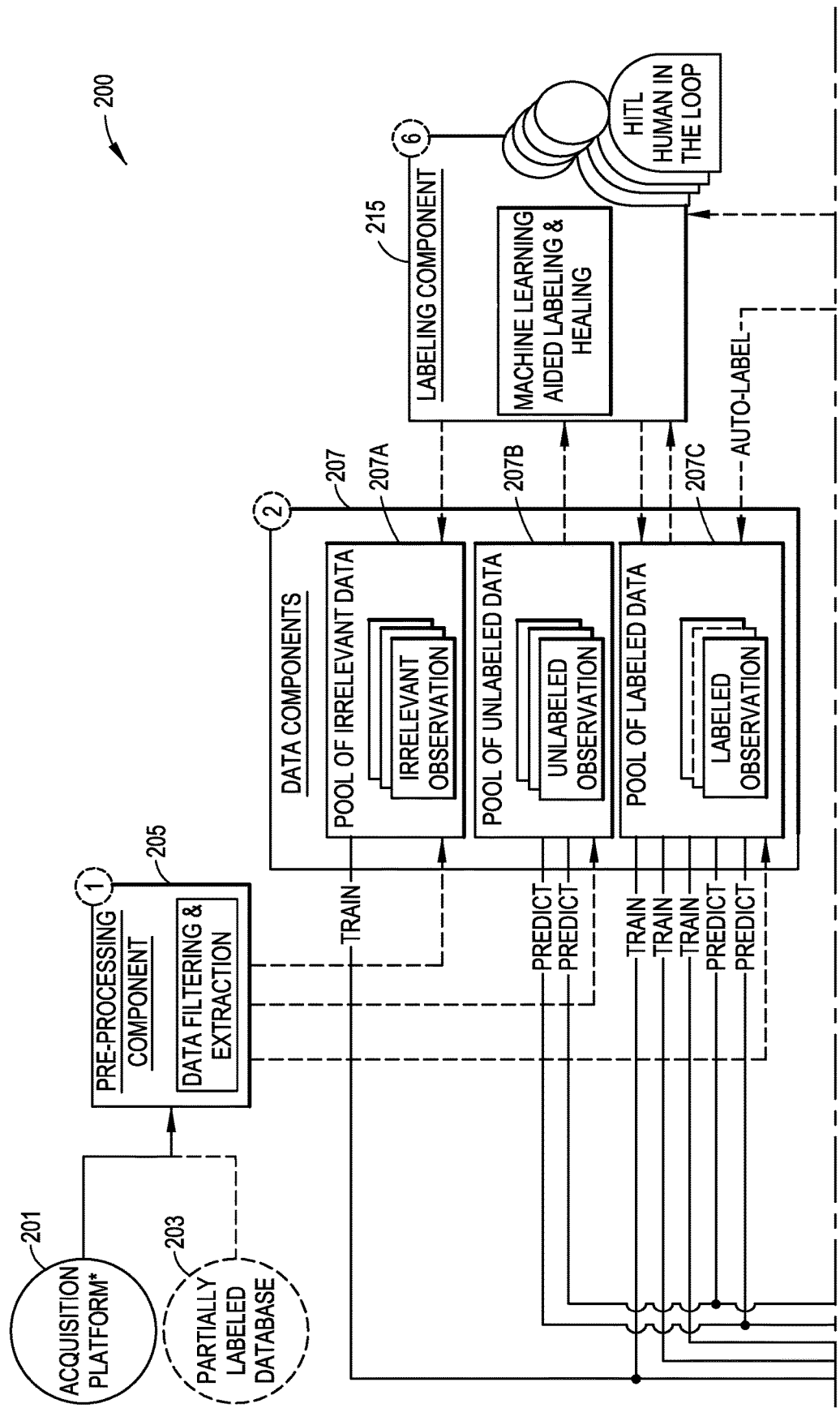

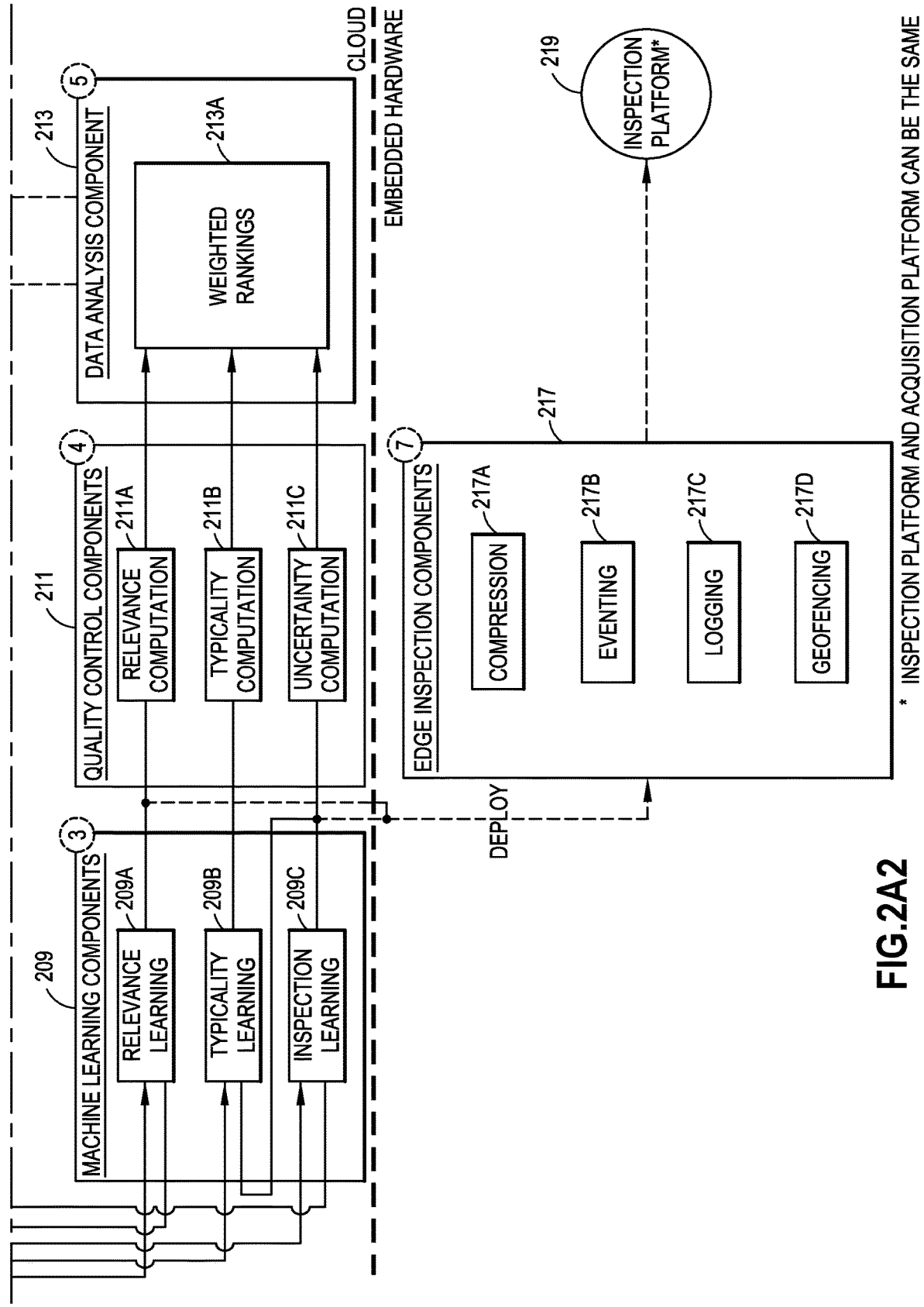
FIG.2A2

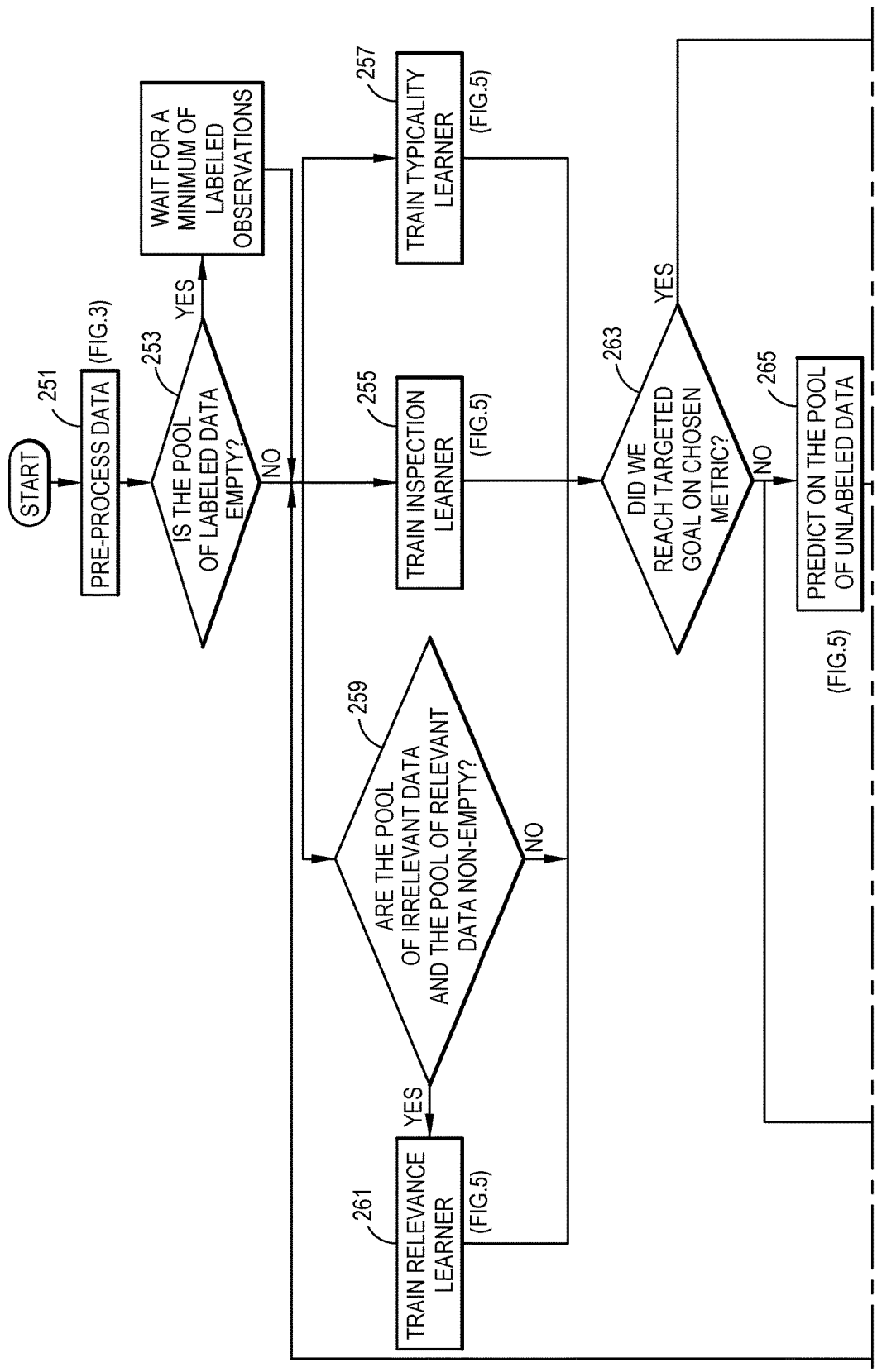

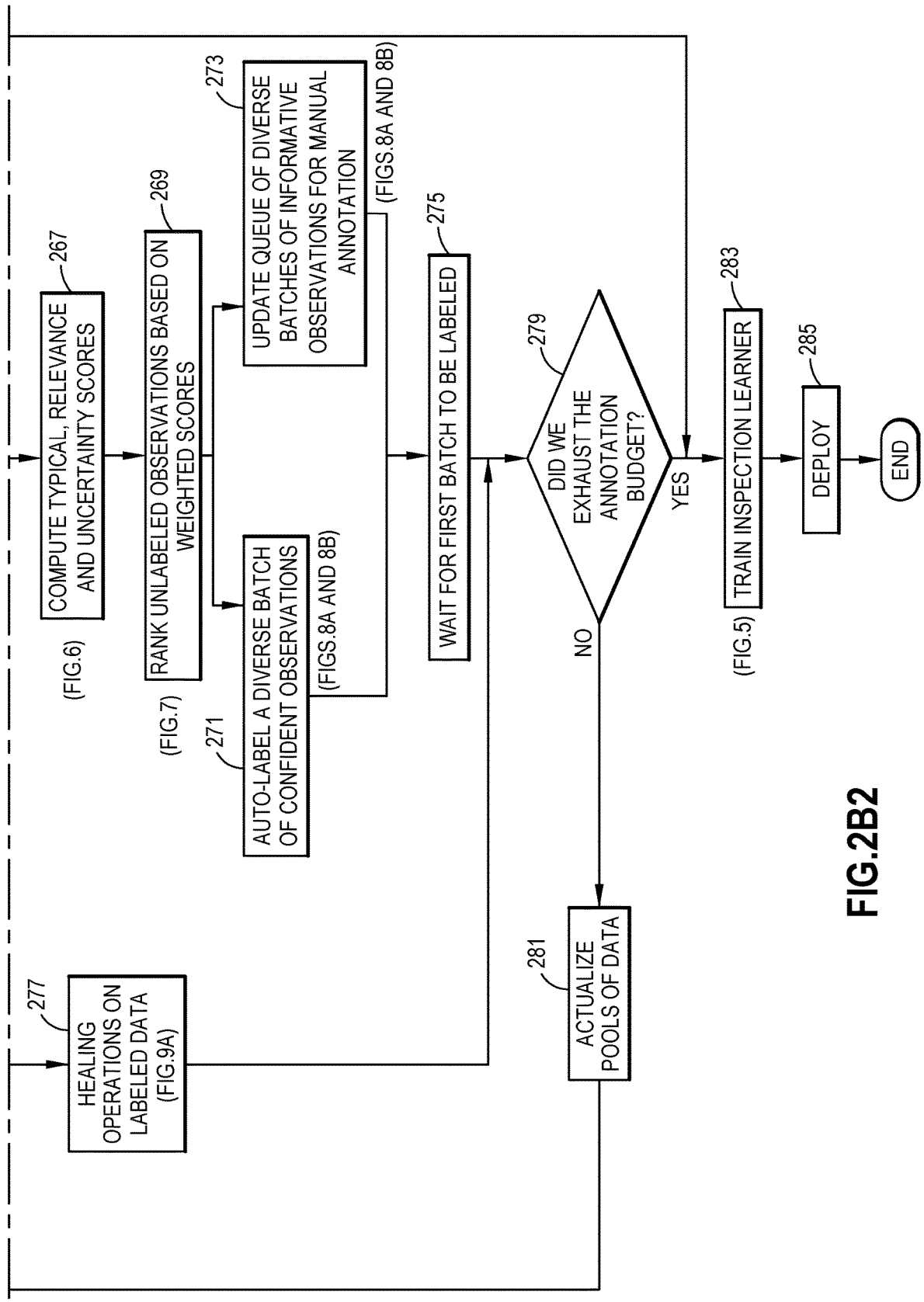
FIG.2B2

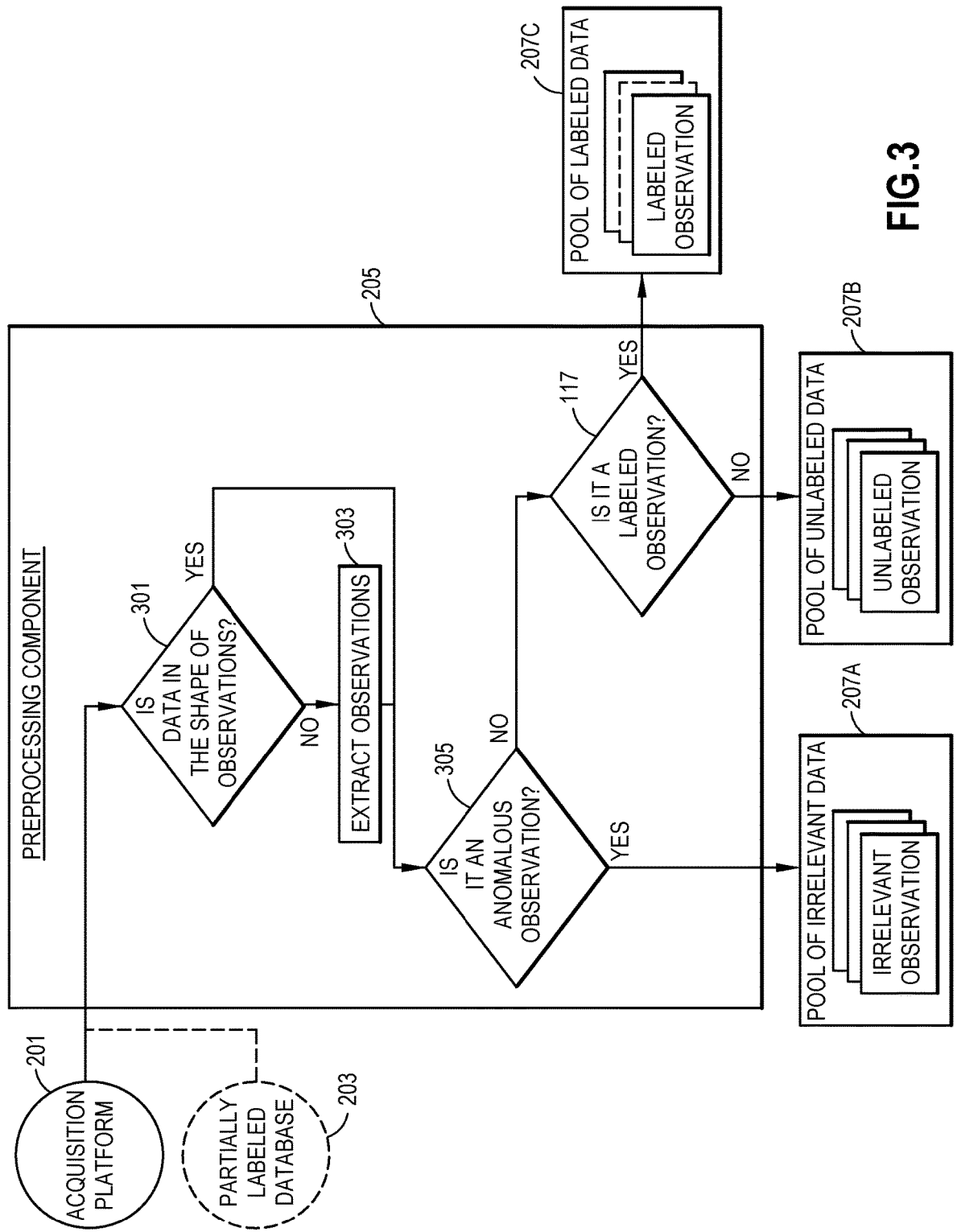

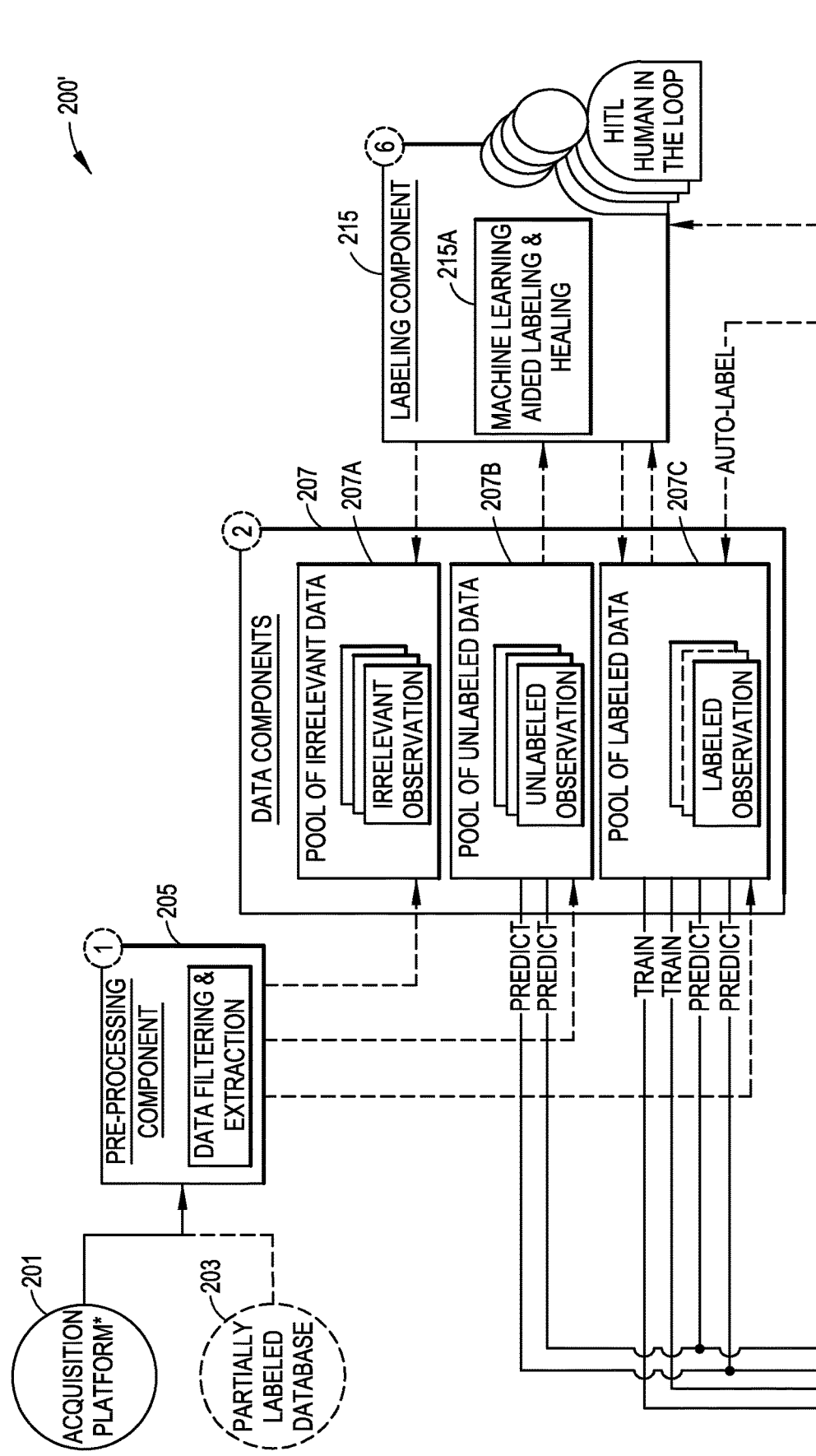

ACTIVE LEARNING FRAMEWORK FOR MACHINE-ASSISTED TASKS

CROSS-REFERENCE TO RELATED APPLICATION(S)

The subject disclosure is a national stage entry under 35 U.S.C. 371 of International Application No. PCT/US2019/052642, filed Sep. 24, 2019, which claims priority from U.S. Provisional Application No. 62/735,568 filed on Sep. 24, 2018 and U.S. Provisional Application No. 62/872,609 filed on Jul. 10, 2019, herein incorporated by reference in its entirety.

FIELD

The subject disclosure relates to active learning. More specifically, the subject disclosure relates to active learning for machine learning systems for domain-specific tasks such as inspection.

BACKGROUND

To prevent environmental catastrophes and substantial losses, every oil and gas operator must satisfy the General Visual Inspection (GVI) requirement for asset integrity. Inspection below the waterline has often relied on divers working in areas of poor visibility to provide reports on condition and defects. For onshore and offshore field operations' installations that are either hard to get to or present hazardous working conditions for humans, remotely operated vehicles and autonomous vehicles are being used to carry out the inspection task. Through this process, petabytes (PB) of data are generated every year. Such data is typically manually inspected by human operators to identify structural anomalies.

State-of-the-art field inspection techniques rely on deep neural networks which are trained using labeled data samples. Like in the medical field, the bottleneck resides in establishing labeled data samples such that the resulting trained neural network is satisfactory for its intended function. The data samples used to train a neural network are domain specific and sensitive and therefore often require human experts to extract relevant data samples and associate labels with the data samples to annotate ground truth. Moreover, such labeling can be both expensive and time consuming.

SUMMARY

This subject disclosure relates to an active learning framework which provides for better accuracy with fewer training samples.

In embodiments, the active learning framework is provided that includes a plurality of machine learning components that operate over iterations of a training phase followed by an active learning phase. In each iteration of the training phase, the plurality of machine learning components are trained from a pool of labeled observations. In each iteration of the active learning phase, the plurality of machine learning components (which have been trained from the previous iteration of the training phase) are configured to generate scores or metrics that are used to control the sampling (or selection) of unlabeled observations for labeling. The selected unlabeled observations are then subject to a labeling process where one or more observations are annotated with labels for ground truth (or ground truth labels) and become labeled observations. The newly labeled observations are added to a pool of labeled observations for the next iteration of the training phase.

In embodiments, the plurality of machine learning components can include an inspection (or primary) learning component that employs a computation model that is trained to predict a label associated with an unlabeled observation supplied as input to the computation model and generate at least one uncertainty score associated with the predicted label. The at least one uncertainty score characterizes the confidence level for the associated predicted label and/or the reproducibility of the associated unlabeled observation. The plurality of machine learning components can also include one or more additional components that generate a score or metric related to quality of an unlabeled observation or quality of the prediction output by the inspection learning component. Such score or metric can be combined with the uncertainty score to provide for efficient sampling of unlabeled observations for labeling.

In embodiments, the one or more additional components can include a typicality learning component that employs a computation model that is trained to generate a typicality score related to typicality of a predicted label output by the inspection learning component and supplied as input to the computational model. The typicality score characterizes the level of divergence of the predicted label relative to the distribution of labels in a pool of labeled observations. One or more composite scores can be generated for a particular unlabeled observation based on the at least one uncertainty score for the predicted label associated with the particular unlabeled observation and the typicality score for the predicted label associated with the particular unlabeled observation. The composite scores can be used to control the sampling (or selection) of the unlabeled observations for labeling.

In embodiments, the one or more additional components can include a relevance learning component that employs a computation model that is trained to generate a relevance score describing the relevance (or irrelevance) of an unlabeled observation supplied as input to the computational model. The composite score(s) generated for a particular unlabeled observation can be based on the relevance score associated with the particular unlabeled observation.

In embodiments, the one or more additional components can include a density learning component that employs a computation model that is pretrained to generate a density score associated with a particular unlabeled observation. The density score characterizes similarity of the particular unlabeled observation relative to a set of other observations. The set of other observations does not include the particular unlabeled observation. The set of other observations can include labeled observations and possibly other unlabeled observations that are different from the particular unlabeled observation. The density score is intended to identify whether the particular unlabeled observation is an inlier with respect to the set of other observations. The composite score(s) generated for the particular unlabeled observation can be based on the density score associated with the particular unlabeled observation.

In embodiments, the framework can include one or more quality control components that generate one or more scores or metrics based on score(s) or other output of the plurality of machine learning components. The composite score(s) generated for a particular unlabeled observation can be based on the score(s) generated by the quality control component(s). For example, a quality control component can be provided that calculates a relevance score describing the relevance (or irrelevance) of an unlabeled observation based on a predicted label output by the inspection learning component. The composite score(s) generated for a particular unlabeled observation can be based on the relevance score associated with the particular unlabeled observation.

In embodiments, the sampling control can be biased to sample informative observations for manual labeling. An informative observation can be identified from the uncertainty, typicality, density and/or relevance scores or metrics produced from the output of the plurality of machine learning components based on the unlabeled observation taken as input. For example, an informative observation can i) produce a predicted label output by the inspection learning component with a relatively high uncertainty score or have low reproducibility, ii) produce a predicted label output by the inspection learning component with a relatively low typicality score (where such low typicality label is divergent from a distribution of labeled observations) and/or a relatively high density score (e.g., where the label is similar to other labeled or non-labeled observations), and iii) have a relatively high relevance score (e.g., not anomalous or off-topic). The sampling control can also be biased to sample confident observations for automatic labeling in order to generate more training data at no cost. A confident observation can be identified from the uncertainty, typicality, density and/or relevance scores or metrics produced from the output of the plurality of machine learning components based on the unlabeled observation taken as input. For example, a confident observation can i) produce a predicted label output by the at least one primary learning component with a relatively low uncertainty score or have high reproducibility, ii) produce a predicted label output by the least one primary learning component with a relatively high typicality score and/or relatively high density score, and iii) have a relatively high relevance score.

In an embodiment, a highly optimized machine learning aided labeling tool is provided that is multi-user and speeds up labeling tasks is provided. This real-time machine learning aided labeling tool can be based on a queue of observations which is updated every time new scores are successfully computed.

In an embodiment, the labeling tool can be configured to allow human annotators to select and correct problematic labels among labeled data. The problematic labels can be identified from the uncertainty, typicality, density and/or relevance scores or metrics produced from the output of the plurality of machine learning components based on labeled observations taken as input. For example, a problematic label can i) have a relatively high uncertainty score or have low reproducibility, ii) have a relatively low typicality score and/or a relatively low-density score, and iii) a relatively low relevance score.

A framework for active learning for Object Detection is also described which incorporates an ensemble disparity metric that exceeds the usual Intersection over Union (IoU) metric. The framework can also employ a novel way to compute the typicality metric for bounding boxes based on multi-class channel stacking.

The framework can extend beyond traditional active learning by incorporating a real-time pre-processing step (from an acquisition platform) and/or post-processing step (edge deployment).

In the specific task of inspection with an autonomous underwater vehicle (AUV) of subsea asset integrity, inferences can be provided by one or more machine learning components of the framework in real-time in an embedded node (at the edge) to compress the mission duration whilst maximizing the detection likelihood of features of interest. This entails controlling the speed of the subsea vehicle based on features present in the field of view or features further ahead below the path of the vehicle detected by other sensors.

In the specific task of seismic interpretation, where seismic sections can be considered as the inputted unlabeled datasets and the manual interpretations done by an expert interpreter the labels, the framework can be used to reveal to the user only the meaningful subset of the seismic sections to be labeled rather than asking the user to interpret all seismic sections and let the machine learning assisted labeling do the rest of the labeling reducing the fastidious labeling task while improving the overall prediction accuracy.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2A is a schematic block diagram of an embodiment of an active learning framework in accordance with the present disclosure;

FIG. 2B is a flow chart illustrating operations carried out by the active learning framework of FIG. 2A in accordance with embodiments of the present disclosure;

FIG. 3 is schematic diagram illustrating operations carried out by a pre-processing component of the active learning framework of FIG. 2A in accordance with embodiments of the present disclosure;

DETAILED DESCRIPTION

Figure 1A:
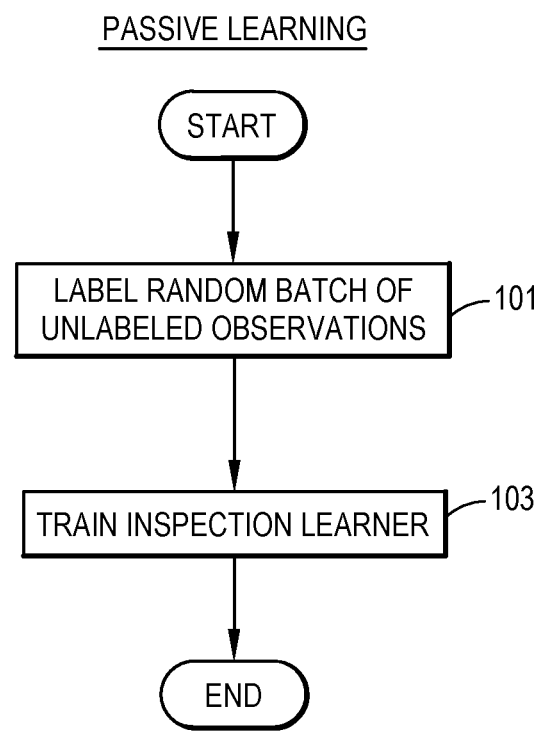
FIG. 1A is a flowchart illustrating a passive learning method.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the subject disclosure relate to automating and digitizing aspects of a machine learning system for use in an inspection task or process where the machine learning system is trained using active learning. Active learning has been a very active research area over the past years as it is intended to reduce the cost of annotating observations (data samples) that are used to train the machine learning system. "Active Learning Literature Survey", University of Wisconsin-Madison Department of Computer Sciences, 2010 gives an overview of the active learning methodologies developed so far. Note that the machine learning systems typically have access to large quantity of observations (data), but the budget for annotating the observations is limited. This is where the generic concept of active learning becomes important as active learning incrementally samples or selects observations to be annotated based on their informativeness.

Uncertainty-based methods are the most common active learning methods. Uncertainty-based sampling metrics give a measurement of the uncertainty of the machine learning system over its predictions. For classification problems (which occurs in most inspection tasks such as Objection Detection, Segmentation, Classification), the most common metrics are entropy, variation ratio and Bayesian active learning for classification and preference learning.

Relevance can also be used for active learning. Irrelevant observation filtering was presented by Mazzoni et al., "Active Learning with Irrelevant Examples," Proceedings of the Seventeenth European Conference on Machine Learning, 2006, which introduced the notion of relevance bias where a relevance classifier influences the machine learning system's uncertainty-based rankings so that irrelevant observations are less likely to be sampled for annotation.

Typicality can also be used for active learning. Bappy et al., "The Impact of Typicality for Informative Representative Selection," Conference on Computer Vision and Pattern Recognition, 2017, proposed an active learning framework including the concept of typicality, hereinafter Bappy. The active learning framework of Bappy focused on object recognition and classification tasks. An atypical score is computed based on (1) feature values and (2) contextual relationship between observations when available. The feature values of (1) measure how much features extracted from an observation deviate from the mean feature representation for the predicted label class. The contextual relationship of (2) measures how the predicted label differs from the expected label classes based on contextual information.

Active learning can also be used for object detection. Object detection typically involves identifying one or more bounding boxes within an observation and assigning one or more classes to the bounding box(es). The location of the bounding boxes in the observation and the assigned class(es) produced by object detection are commonly referred to as a prediction. Active learning can be used to compute metrics related to uncertainty of an object detector over its predictions. Active learning can also be used to take into account the detector localization ability. See Kao et al., "Localization-Aware Active Learning for Object Detection," arXiv, 2018, which introduces the notions of (1) localization tightness (Intersection over Union—also called IoU—between intermediate region-proposal and final bounding box) and (2) localization stability (IoU between final bounding boxes when we increasingly add noise). In Rhee et al., "Active and Semi-Supervised Learning for Object Detection with Imperfect Data," Cognitive Systems Research, 2017, the concept of diversity sampling from Xu et al., "Representative Sampling for Text Classification Using Support Vector Machines," Proceedings of ECIR-03, 25th European conference on information retrieval, 2003 was added to an active learning framework in order to avoid redundancy among selected observations for labeling. Finally, Wang et al., "Towards Human-Machine Cooperation: Self-supervised Sample Mining for Object Detection," Conference on Computer Vision and Pattern Recognition, 2018 introduced a sampling strategy based on consistency where region proposals are cropped and pasted into new contexts to see if the predictions hold true. Consistent predictions are auto-labeled whereas inconsistent predictions are redirected to the annotator for manual labeling.

Giving informative observations to the annotator(s) is the first step toward efficiently generating training data. The second step is producing high quality labels for observations within as little time as possible. In Konyushkova et al., "Learning Intelligent Dialogs for Bounding Box Annotation", Conference on Computer Vision and Pattern Recognition, 2018," an agent is trained to automatically choose a sequence of labeling tasks (box verification or box drawing in the context of Object Detection) to produce labels in a minimal amount of time. Papadopoulos et al., "We don't need no Bounding-Boxes: Training Object Class Detectors using only Human Verification," Conference on Computer Vision and Pattern Recognition, 2016 also aims at speeding-up label generation for object detection by requiring that the annotator verify only bounding-boxes produced automatically by the object detection. The informativeness of the bounding-boxes get iteratively better due to annotator feedback and search space reduction.

In the subject disclosure, an improved active learning framework is provided for a machine learning system that is trained for use in a domain specific machine-assisted task such as inspection. The active learning framework ("framework") provides for better accuracy of the machine learning system with fewer training samples. The framework introduces a new end-to-end (e.g., from data acquisition platform to deployment on edge inspection platform) cost-effective and agnostic solution which combines state-of-the-art active learning sampling metrics and labeling enhancement methods. Furthermore, the framework employs a new way of handling irrelevant data, new sampling metrics in the case of object detection, and a healing tool to recognize and correct bad annotations. In an embodiment, the framework can be incorporated into a cloud-based computing environment, for example, as part of one or more real-time cloud-based applications.

In embodiments, the active learning framework includes a plurality of machine learning components that operate over iterations of a training phase followed by an active learning phase. In each iteration of the training phase, the plurality of machine learning components are trained from a pool of labeled observations. In each iteration of the active learning phase, the plurality of machine learning components (which have been trained from the previous iteration of the training phase) are configured to generate scores or metrics that are used to control the sampling (or selection) of unlabeled observations for labeling. The selected unlabeled observations are then subject to a labeling process where one or more observations are annotated with labels for ground truth (or ground truth labels) and become labeled observations. The newly labeled observations are added to a pool of labeled observations for the next iteration of the training phase.

In embodiments, the plurality of machine learning components can include the following components: i) a relevance learning component, ii) an inspection (or primary) learning component, and iii) a typicality learning component. The relevance learning component employs a computation model that is trained to generate a relevance score that describes the relevance (or irrelevance) of an unlabeled observation supplied as input to the computational model. The inspection learning component employs a computation model that is trained to predict a label associated with an unlabeled observation supplied as input to the computation model and generate at least one uncertainty score associated with the predicted label. The at least one uncertainty score characterizes the confidence level for the associated predicted label and/or the reproducibility of the associated unlabeled observation. The typicality learning component employs a computation model that is trained to generate a typicality score related to typicality of a predicted labeled output by the inspection learning component and supplied as input to the computational model. The typicality score characterizes the level of divergence of the predicted label associated therewith relative to the distribution of labels in a pool of labeled observations. The framework can include one or more quality control components and/or data analysis components that generates one or more composite scores for a particular unlabeled observation based on a combination of the relevance score for the particular unlabeled observation, the at least one uncertainty score associated with the particular unlabeled observation and corresponding predicted label, and the typicality score for the predicted label associated with the particular unlabeled observation. The composite scores associated with unlabeled observations can be used to control the sampling (or selection) of the unlabeled observations for labeling. In embodiments, such sampling control can be biased to sample informative observations for manual labeling involved at least one human annotator. The sampling control can also be biased to sample confident observations for automatic labeling (without a human annotator) in order to generate more training data at no cost.

With respect to the automation of inspection tasks or processes, the bottleneck remains labeling observations to train the machine learning system that will be used in the inspection task or process. One of the specificities of the inspection domain is that the inspection task can generate a great amount of observations (data), but a fair proportion of such observations may be anomalous (real world conditions, hardware or communication failures leading to noise, saturations . . . ) or off-topic (acquisitions covering more than the inspection scope). The latter observations are rather confusing even for expert human annotators which are likely to produce inconsistent labels and ultimately harm the performance of the machine learning system. In order to not waste the annotator's time, the active learning framework can be configured to identify and extract those observations on which the machine learning system hasn't been trained and hence observations which are more likely to be picked during the active learning process. For these reasons, the framework of the subject disclosure can employ a relevance learning component that not only helps select observations to be labeled but also cooperates with the inspection learning component to build cutting-edge applications for inspection tasks or processes.

In embodiments, the framework can employ an inspection learning component (or primary learning component) that generates a prediction corresponding to an unlabeled observation. The prediction includes a label associated with the unlabeled observation and one or more uncertainty scores associated with the label. In embodiments, the label can specify the location of one or more bounding boxes and one or more classes associated with the bounding box(es). The uncertainty score(s) can characterize the confidence level for the associated label and/or the reproducibility of the associated unlabeled observation. In some instances (for example, in the case of a missed detection), the inspection learning component can be wrongly confident about its prediction. A typicality score can be generated by a typicality learning component directly from a label predicted by the inspection learning component. In embodiments, the typicality score can characterize the level of deviation of a label predicted by the inspection learning component relative to the distribution of labels in a pool of labeled observations. This pool of labeled observations typically increases in size over the iterations of the active learning phase as observations are annotated with labels for ground truth. In this manner, the typicality scores generated from the output of the typicality learning component can aid in identifying atypical or odd labels predicted by the inspection learning component over the iterations of the active learning phase.

In embodiments, the framework can be configured to automatically sample (or select) unlabeled observations for labeling based on one or more composite scores derived from a combination of relevance, typicality and uncertainty scores or metrics. This provides a highly optimized machine learning aided labeling tool that is multi-user and works in real-time. In the case of multi-labeled inspection tasks (multiple labels for a single observation), the time for the labeling task can be reduced by partially labeling observations with most confident labels so that the annotator only focuses on labels with lesser confidence.

In embodiments, the framework can also include a mechanism for a human annotator to review predicted labels as it is faster to validate or reject a predicted label than create a label from scratch. Note that creation of label from scratch can be a time consuming and tedious task for Object Detection and even more for Segmentation.

Furthermore, one impediment of the generic concept of active learning is that the machine learning system must be trained before every acquisition of new observations for labeling so as to improve the accuracy of the machine learning system over time. This is clearly not compatible with real-time solutions. Training of the machine learning system takes time and for obvious business concerns, one cannot make human annotators wait for new observations to come in. Fine-tuning the training of the machine learning system and the sampling observations by batches can help mitigate these issues. However, to avoid these issues, the framework can employ a queue or buffer of new unlabeled observations that have been collected since the most-recent active learning phase and follow-on training phase. This queue or buffer of new unlabeled observations can be processed in a batch mode where the unlabeled observations in the queue or buffer are processed by the machine learning components to control sampling and labeling of the unlabeled observations as a batch.

Note that human annotators are not perfect. Wrong labels can significantly harm the performance of the machine learning components of the framework, particularly the performance of the inspection learning component. To address this issue, the framework can include a healing tool that allows the human annotator(s) to select and correct problematic labels among labeled observations. The problematic labels can be identified from the relevance, uncertainty and typicality scores or metrics produced from the output of the plurality of machine learning components based on labeled observations taken as input. Furthermore, as more data usually helps the machine learning components to better generalize, certain predictions with sufficiently low uncertainty (high confidence) can be selected for automatic labeling (without human involvement) in order to generate more training data at no cost.

In embodiments, the at least one uncertainty score generated by the inspection learning component can include an ensemble disparity score metric, which is an uncertainty-based sampling metric that outperforms other metrics relying on Intersection over Union (IoU). Furthermore, the typicality score generated by the typicality learning component can be computed for bounding boxes within an observation based on multi-class channel stacking.

Furthermore, the framework can be configured to extend beyond the spectrum of traditional active learning by encompassing pre-processing and/or post-processing steps.

In embodiments, the inspection learning component of the framework can be trained for object detection and classification as part of a machine-assisted task. For example, the inspection of subsea and above ground oil and gas facilities can involve a number of sensor modalities, such as video data captured by a video camera, three-dimensional point data (or a point cloud) captured by LiDAR, and acoustic data captured by sonar. One or more of the sensor modalities can be mounted to a remote-controlled submarine for subsea inspection or mounted on a UAV or drone for above ground inspection. After one or more of the machine learning components of the framework (such one or both of the relevance learning component and the inspection learning component) has been trained by operation of the active learning framework, such trained component(s) can be deployed as part of an embedded processing platform of the vehicle (submarine or UAV or drone) that carries out the inspection task. The trained machine learning component(s) can be configured to process the sensor data output by the sensors of the vehicle for automatic object detection and classification with uncertainty. The automatic object detection and classification function of the machine learning components(s) generates predicted labels corresponding to the sensor data. The predicted labels can be processed or otherwise used to configure or control various operations (such as data compression for data communication to a remote system, reporting or messaging events to a remote system, logging or storing data relevant to the inspection task, and controlling the navigation of the vehicle).

In other embodiments, the inspection learning component of the framework can be trained for object detection and classification as part of other machine-assisted tasks.

For example, autonomous vehicles can involve a number of sensor modalities, such as video data captured by a video camera, three-dimensional point data (or a point cloud) captured by LiDAR, and radar data captured by radar. One or more of the sensor modalities can be mounted to a vehicle (such as car or truck or bus). After one or more of the machine learning components of framework (such one or both of the relevance learning component and the inspection learning component) has been trained by operation of the active learning framework, such trained component(s) can be deployed as part of an embedded processing platform of the vehicle. The trained machine learning component(s) can be configured to process the sensor data output by the sensors of the vehicle for automatic object detection and classification with uncertainty. The automatic object detection and classification function of the machine learning components(s) generates predicted labels corresponding to the sensor data. The predicted labels can be processed or otherwise used to configure or control various operations of the vehicle, such controlling the navigation of the vehicle.

In another example, medical imaging and computer-assisted surgery can involve a number of imaging modalities, such as video data captured by a video camera and three-dimensional and four-dimensional image data captured by computed tomography or CT or CAT scan, magnetic resonance imaging or MM, positron emission tomography or PET, ultrasound and/or x-rays. One or more of the imaging modalities can be integrated as part of a medical imaging system. After one or more of the machine learning components of framework (such one or both of the relevance learning component and the inspection learning component) has been trained by operation of the active learning framework, such trained component(s) can be deployed as part of an embedded processing platform of the medical imaging system. The trained machine learning component(s) can be configured to process the data output by the imaging modality(ies) of the system for automatic object detection and classification with uncertainty. The automatic object detection and classification function of the machine learning components(s) generates predicted labels corresponding to the image data. The predicted labels can be processed or otherwise used to configure or control various operations of the system, such reporting or messaging events to a user or remote system, logging or storing data relevant to the medical imaging task and controlling aspects of the system for computer-assisted surgery.

Figure 1B:
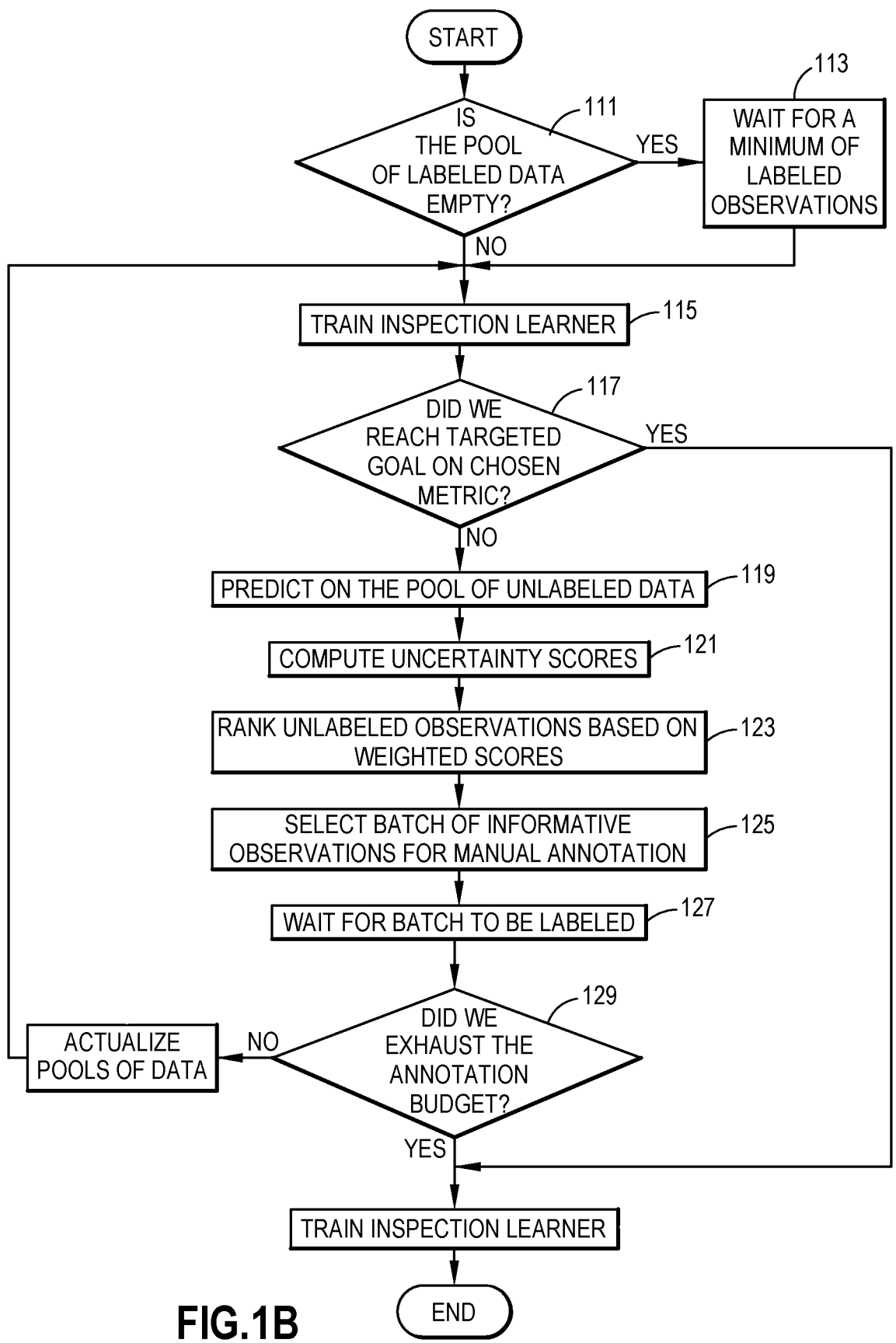
FIG. 1B is a flowchart illustrating an active learning method in accordance with embodiments of the present disclosure.

Active learning is different from passive learning as illustrated in the flowcharts of FIGS. 1A and 1B. FIG. 1A illustrates a passive learning framework where in block 101 a human annotator labels a random batch of unlabeled observations. The batch of labeled observations generated in block 101 are then used to train a machine learning system in block 103. FIG. 1B illustrates an active learning framework according to the present disclosure where blocks 111 and 113 are performed in order to ensure that a minimum number of labeled observations are available. If so, the operations continue to block 115 to initially train a machine learning system using the labeled observations followed by an initial active learning phase (blocks 119 to 127). The operations continue to perform an iterative loop that includes the training phase (a repeat of block 115) followed by the active learning phase (blocks 119 to 127) until the loop is terminated when an annotation budget has been exhausted (block 129) or a target goal on a chosen metric has been met (block 117). The annotation budget can be an amount of money or other value that is exhausted by payments or other cost items attributable to the labeling of observations performed by the human annotator(s) and possibly other parts of the learning process. The active learning phase of blocks 119 to 127 uses the trained machine learning system to generate a prediction for an unlabeled observation (block 119) and compute a metric (such as an uncertainty score) associated with the prediction (block (121). The metrics associated with the predictions are then used to rank unlabeled observations (block 123), and the ranking of the unlabeled observations is used to control sampling or selection of the unlabeled observations (block 125) for labeling (block 127).

FIG. 2A is a functional block diagram that illustrates an embodiment of an active learning framework 200 for a machine learning system that is trained for use in a machine-assisted inspection task or process. The framework 200 covers all the steps from the acquisition of the training data (acquisition platform: automated underwater vehicle, remotely operated vehicle, drone . . . ) to the deployment of the trained inspection learner on edge-based platforms (NVIDIA® Jetson™ TX2/Xavier, INTEL® Movidius™ . . . ) to analyze and post-process live observations. Exemplary operations carried out by the components of the active learning framework 200 are illustrated in the flowchart of FIG. 2B.

The framework 200 includes a pre-processing component 205, which is the point of entry for inputting data into framework 200. The data can come in various forms, such as from an acquisition platform 201 or an existing partially labeled database 203. The pre-processing component 205 extracts unlabeled observations from the data input from the acquisition platform 201 and adds such unlabeled observations to a pool of unlabeled data 207B. The pre-processing component 205 can also function to extract labeled observations from the partially labeled database 203 and add such labeled observations to a pool of labeled data 207C. The pre-processing component 205 can also function to extract unlabeled observations from the partially labeled database 203 and add such unlabeled observations to the pool of unlabeled data 207B. Such operations are part of block 251 of FIG. 2B.

The framework 200 can also be configured to check whether the pool of labeled data is empty in block 253 in order to ensure that a minimum number of labeled observations are available. If so, the operations continue to block's 255 to 261 to initially train the machine learning components of the system using the labeled observations store in the pool of labeled data 207C and then performs an initial active learning phase (blocks 265 to 275). The operations then perform an iterative loop that includes the training phase (a repeat of blocks 255 to 261) followed by the active learning phase (a repeat of blocks 265 to 275) until the loop is terminated when a predefined annotation budget has been exhausted (block 279) or a target goal on a chosen metric has been met (block 263). The predefined annotation budget can be an amount of money or other value that is exhausted by payments or other cost items attributable to the labeling of observations performed by the human annotator(s) and possibly other parts of the learning process. The active learning phase of blocks 265 to 275 uses the trained machine learning components of the system to generate predictions for each one of a number of unlabeled observations (block 265) and compute metrics (typicality score, relevance score, uncertainty score) associated with the predictions for each one of a number of unlabeled observations (block (267). One or more composite scores (or weighted scores) are computed based on the metrics (typicality score, relevance score, uncertainty score) associated with the predictions for the unlabeled observations, and the composite scores for the unlabeled observations are then used to rank unlabeled observations (block 269). The ranking of the unlabeled observations is used to control sampling of the unlabeled observations (block 125) for a batch-mode labeling process, which includes automatic labeling without human annotation (block 271) as well as manual labeling involving human annotation (block 273). The results of the labeling process are added to (stored in) the appropriate data pool (block 281). The operations can also include healing operations that use the trained machine learning components to possibly identify one or more problematic labels and corresponding observations that are stored in the pool of labeled data 207C for review by a human annotator and subsequent update or discarding of the label for the observation as dictated by input from the human annotator (block 277). After the iterative loops have been completed (e.g., the predefined annotation budget has been exhausted (block 279) or a target goal on a chosen metric has been met (block 263)), the operations continue to block 283 to train the inspection learning component of the system (and possibly other machine learning components of the system) using the final version of the labeled observations as produced by the last active learning phase. One or part of the machine learning system (including the inspection learning component) as trained in block 283 can then be deployed for its intended used (block 285).

Details of the operations of block 251 of FIG. 2B are shown in FIG. 3, in which the pre-processing component 205 can be configured to perform the operations of blocks 301 and 303 that extract and format the input data to a common format suitable for processing as a data sample which is referred to herein as an observation. Next, the pre-processing component 205 can be configured to perform filtering operations in block 305. The filtering operations of block 305 redirect an anomalous observation to a pool of irrelevant data 207A. The definition of an anomalous observation can depend on the inspection task. Furthermore, the filtering operations of block 305 can filter out duplicate (or near-duplicate) observations. The definition of a duplicate (or near-duplicate) observation can depend on the inspection task. An example for the object-detection use-case is presented below. Next, in block 307, the pre-processing component 205 can be configured to add a "good" observation that passes the filtering operations of block 305 to either a pool of unlabeled data 207B or a pool of labeled data 207C according to whether a label was initially provided or not. In this manner, unlabeled observations are added to the pool of unlabeled data 207B and labeled observations are added to the pool of labeled data 207C.

The pool of irrelevant data 207A, the pool of unlabeled data 207B, and the pool of labeled data 207C are collectively referred to as data components 207. The observations held in one or more of the data components 207 (such as observations stored in the pool of irrelevant data 207A and observations stored in the pool of labeled data 207C) can be used in the training phase (e.g., blocks 255 to 261 of FIG. 2B) to train the machine learning components of the system. The observations held in one or more of the data components 207 (such as observations stored in the pool of unlabeled data 207B and observations stored in the pool of labeled data 207C) can be used in the active learning phase (e.g., blocks 265 to 275 of FIG. 2B) to generate the metrics that are used to control the sampling of unlabeled observations for labeling. The operations of the pre-processing component 205 can be carried out prior to or during the iterations of the training phase and active learning phase as described herein. For example, as new acquisitions are made regularly, new data can be processed by the pre-processing component 205 and flow into the system at any time in the processing performed by the framework.

In embodiments, the pool of irrelevant data 207A holds observations which are either out of the inspection scope (observations not relevant for the current inspection task) or anomalous observations (noise, saturations . . . ) which are likely to confuse both human annotator(s) and the inspection learning component 209C. Such observations can be used in the training phase (e.g., block 261 of FIG. 2B) to train the relevance learning component 209A.

In embodiments, the pool of unlabeled data 207B holds unlabeled observations (which are observations that have not been labeled yet). The ultimate goal of the active learning phase (e.g., blocks 263 to 279 of FIG. 2B) is to label a fraction of such observations in order to improve the function of the inspection learning component 209C (as well as improve the function of the relevance learning component 209A and the typicality learning component 209B) by selecting the most informative ones for labeling by the labeling component 215.

Figure 4:
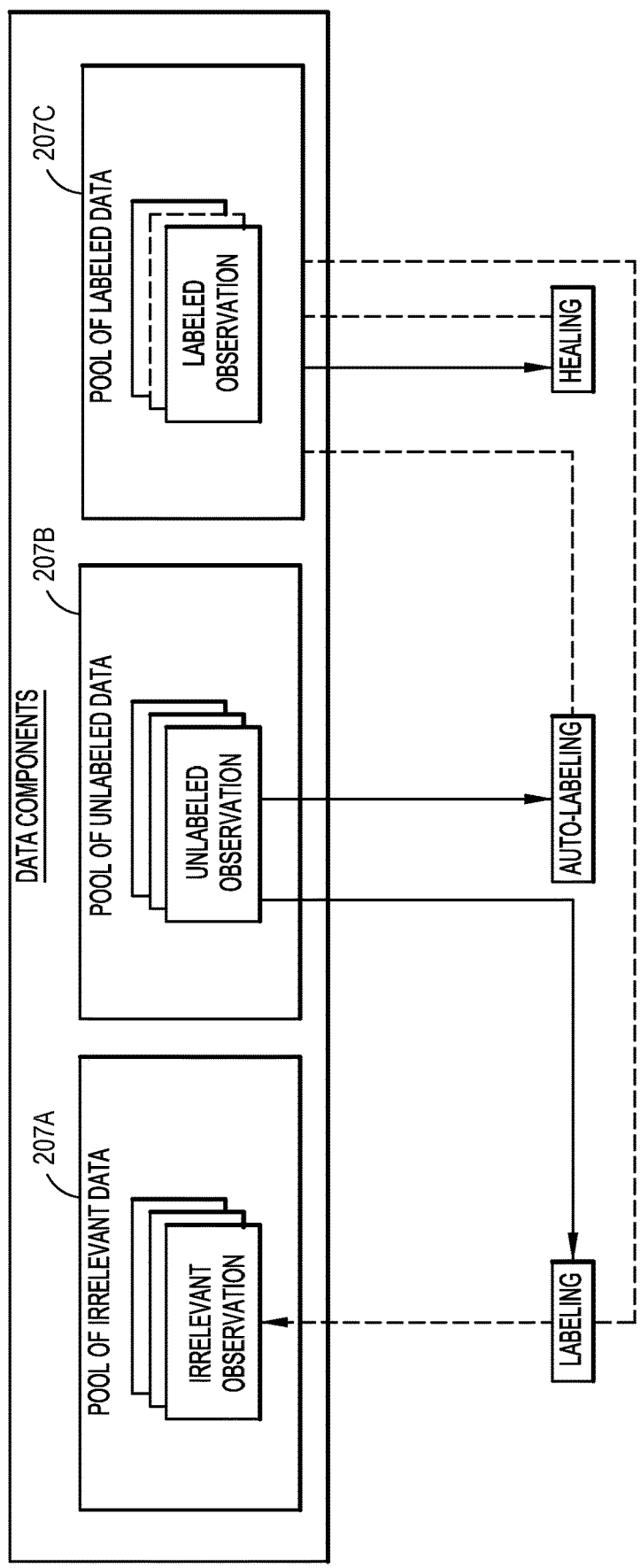
FIG. 4 is a schematic diagram illustrating data components that are part of the active learning framework of FIG. 2A in accordance with embodiments of the present disclosure.
Figure 8:
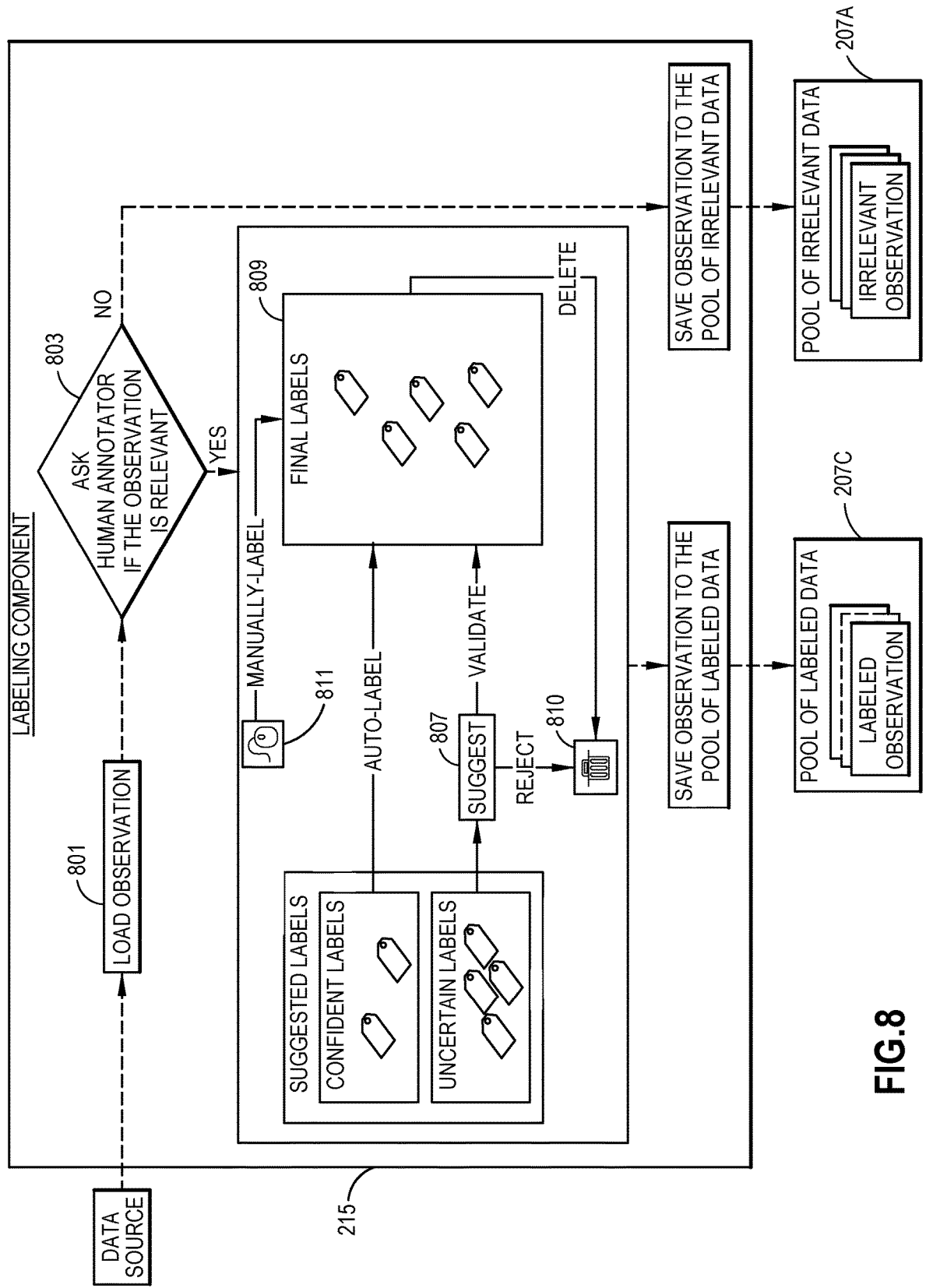
FIG. 8 is a schematic diagram illustrating a labeling component that is part of the active learning framework of FIG. 2A in accordance with embodiments of the present disclosure.

In embodiments, the pool of labeled data 207C holds labeled observations. This means that observations in this pool store ground truth information which are specific to the intended inspection task. Such labeled observations can be used in the training phase (e.g., blocks 255 to 261 and block 283 of FIG. 2B) to train the relevance learning component 209A, the typicality learning component 209B and/or the inspection learning component 209C. Observations depicted with a dotted border in this pool are observations which have been auto-labeled by the data analysis component 213. They have a temporary label and are used to train the inspection learner once before going back to the pool of unlabeled data. From time to time, annotators can heal (review and correct) a problematic labeled observation which may be wrongly labeled (e.g., as part of the healing process of block 277). Exemplary details of the healing process are described below with respect to FIGS. 4, 8, and 9B.

Figure 5:
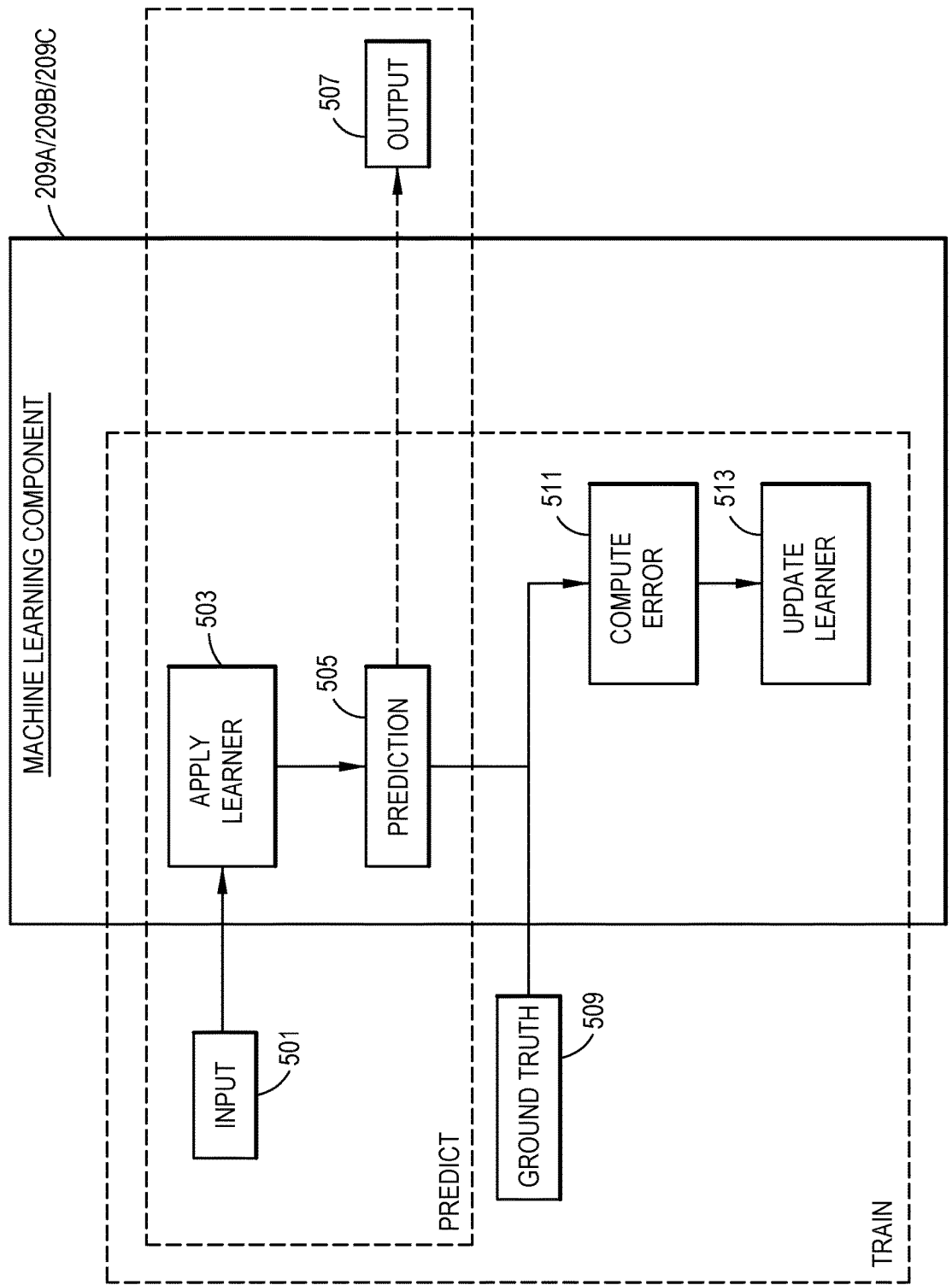
FIG. 5 is a schematic diagram illustrating machine learning components that are part of the active learning framework of FIG. 2A in accordance with embodiments of the present disclosure.

In embodiments, the framework 200 includes a set of machine learning components (labeled 209), which include the relevance learning component 209A, the typicality learning component 209B and the inspection learning component 209C. Each one of these machine learning components can be trained during the training phase (e.g., blocks 255 to 261 of FIG. 2B) or during the final training (block 283 of FIG. 2B), or can be used for predictions in the active learning phase (e.g., blocks 265 to 279 of FIG. 2B) as illustrated in FIG. 5. Blocks 503 to 513 illustrate the training of a machine learning component based on a labeled observation. The observation is used as input (block 501) to the machine learning component (block 503) to generate a corresponding prediction (block 505). The prediction (block 505) and the ground truth label of the observation (block 509) are used to compute an error (block 511), and such error is used to update the machine learning component (block 513). Blocks 503 and 505 also illustrate inference operations that generate a prediction using a machine learning component based on an unlabeled observation. In this case, the unlabeled observation is used as input (block 501) to the machine learning component (block 503) to generate a corresponding prediction (block 505) for output (block 507).

In embodiments, the relevance learning component 209A is trained on relevant and irrelevant observations where irrelevant observations are taken from the pool of irrelevant data 207A and relevant observations are observations which have been labeled by operation of the framework (and therefore have passed the relevance test). The relevance learning component 209A can be embodied by a suitable binary classifier trained to distinguish irrelevant observations from relevant observations.

In embodiments, the typicality learning component 209B is trained on the labels of the observations from the pool of labeled data 207C. The typicality learning component 209B can be embodied by a suitable one-class classifier in the case that the framework 200 employs only positive typicality (typical) samples. The typicality learning component 209B can be configured to identify labels deviating from a given distribution of labels. The architecture of the typicality learning component 209B depends on the shape of labels and therefore on the inspection task. One example will be given for the object detection use-case below, but it can be readily be adapted to handle any label structure.

In embodiments, the inspection learning component 209C is trained on the pool of labeled observations. The architecture of the inspection learning component 209C can depend on the inspection task as well as the deployment edge hardware components 217. Furthermore, based on the metrics chosen for the uncertainty computation, the inspection learning component 209C can be modified to generate better uncertainty measurements, such as by employing an ensemble of learners, a Bayesian neural network (BNN) instead of convolutional neural networks (CNN), or by introducing Monte Carlo dropout.

Figure 6:
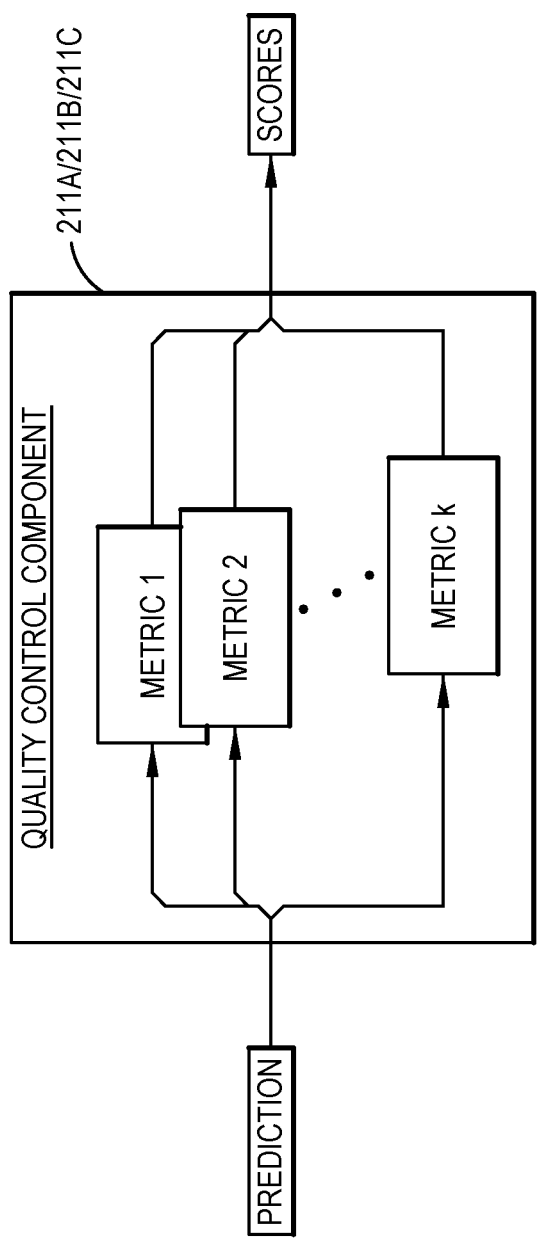
FIG. 6 is a schematic diagram illustrating quality control components that are part of the active learning framework of FIG. 2A in accordance with embodiments of the present disclosure.

In embodiments, the framework 200 can also include a set of quality control components 211 that provide various scores or metrics to gauge the quality of an unlabeled observation. As shown in FIGS. 2A and 6, the set of quality control components 211 take as inputs the predictions of a corresponding set of machine learning components 209 for a given unlabeled observation and returns scores describing the unlabeled observation itself or the quality of the prediction output by a machine learning component for this unlabeled observation. The scores or metrics provided by the set of quality control components can be copied, computed, derived or otherwise determined from the scores or other data output from the machine learning components. These scores will later be fed into the data analysis component 213 to compute composite scores and overall rankings for a number of unlabeled observations.

In embodiments, the set of quality control components 211 includes a quality control component 211A that outputs a relevance score based upon the prediction output by the relevance learning component 209A. The relevance score can discriminate off-the-point observations that could confuse both the human annotator(s) and the inspection learning component 209C if they were to be labeled.

In embodiments, the set of quality control components 211 also includes a quality control component 211B that outputs a typicality score based upon the prediction output by the typicality learning component 209B. The typicality score indicates how much the predictions of the inspection learning component 209C deviate from the distribution of labels in the pool of labeled data 207C by analyzing their inner-structure.

In embodiments, the set of quality control components 211 also includes a quality control component 211C that outputs one or more uncertainty scores based upon the prediction output by the inspection learning component 209C. The uncertainty score(s) indicate a level of confidence in the prediction generated by the inspection learning component 209C. Various uncertainty scores or metrics can be implemented depending on the architecture of the inspection learning component 209C.

In embodiments, the framework 200 also includes a data analysis component 213 that computes one or more composite scores for an unlabeled observation based on the scores or metrics provided by the quality control components 211. The data analysis component 213 can also use the composite scores for a number of unlabeled observations to rank the unlabeled observations (for example, in a weighted ranking 213A).

In embodiments, the framework 200 also includes a labeling component 215 that uses the ranking of unlabeled observations generated by the data analysis component 213 to control sampling of the unlabeled observations for annotation (labeling).

In embodiments, the composite scores and ranking provided by the data analysis component 213 as well as the sampling of the labeling component 215 can be configured such that informative observations are sampled (or selected) to be labeled by the human annotator(s). In one example, the informative observations can include one or more unlabeled observations which are highly relevant (e.g., have relatively high relevance scores) and on which the inspection learning component 209C performs badly (e.g., have relatively high uncertainty scores and relatively low typicality scores) and thus from which we expect to learn the most when annotated. Furthermore, because the observations are sampled in batches, it is desirable that the informative observations be diverse so that multiple weaknesses of the inspection learning component 209C are tackled at the same time.

Furthermore, the composite scores and ranking provided by the data analysis component 213 as well as the sampling of the labeling component 215 can be configured such that a batch of confident observations are automatically labeled without human input (by an auto-labeler). Such automatic labeling can help the inspection learning component 209C generalize by adding more data to the training set. For example, the confident observations can include one or more unlabeled observations which are relevant (e.g., have a relatively high relevance score), typical (e.g., have a relatively high typicality score) and have low uncertainty (e.g., have a relatively low uncertainty score). In the case that the observations are sampled in batches, it is desirable that the confident observations be diverse so that they cover a variety of situations. In embodiments, the labels generated by the auto-labeler can be temporary (for example, valid for one loop) and may be weighted (to have less impact on training) so that they don't have an impact if they are incorrect. The weights may be adjusted as the inspection learning component 209C learns. Furthermore, a diversity criterion can be used to select observations for automatic labeling. For example, unlabeled observations which are the centroids obtained by a k-means algorithm on top score observations described by a set of features can be selected for automatic labeling. A more in-depth example will be given for the object detection use-case below.

Furthermore, the labeling component 215 can be configured such that one or more problematic labeled observations stored in the pool of labeled data 207C can be selected for healing where human annotator(s) heal the labeled observation(s) by updating the corresponding label(s). For example, the problematic labeled observations can include one or more labeled observations which are likely to be bad because they are irrelevant (e.g., have a relatively low relevance score) or because their label is wrong (e.g., have a relative low typicality score and/or a relatively high uncertainty score). In the case of labeled data sampling, metrics can be generated by the machine learning components 209 and associated quality control components 211 to serve the purpose of sampling for the healing process. In this case, an uncertainty metric can be based on the loss of the inspection learning component 209C, a relevance score can be determined in a manner similar to that described above, and a typicality score can be determined in a manner similar to that described above on given problematic labels instead of predicted labels.

Figure 7:
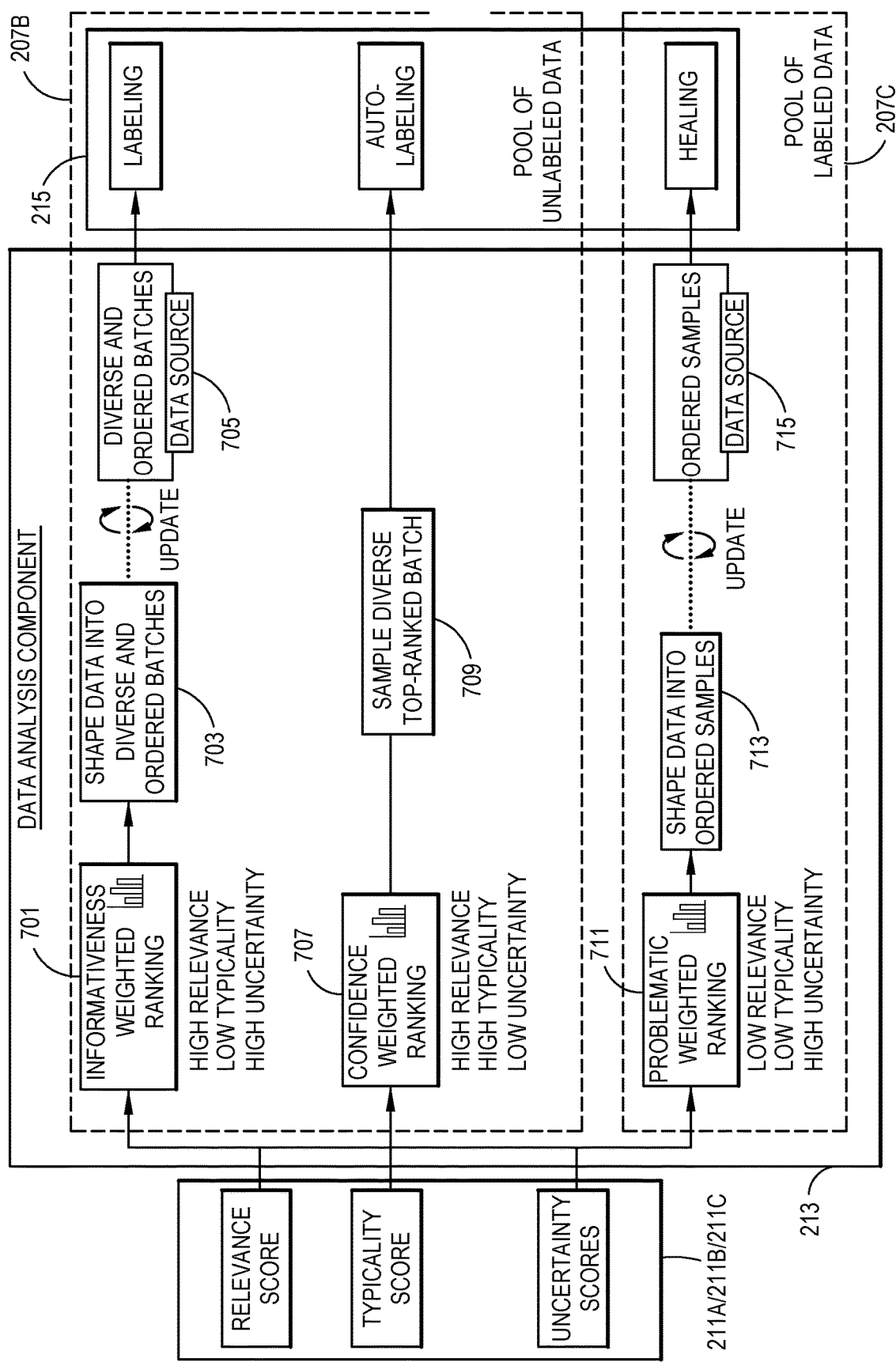
FIG. 7 is a schematic diagram illustrating a data analysis component that is part of the active learning framework of FIG. 2A in accordance with embodiments of the present disclosure.

FIG. 7 depicts operations of the data analysis component 213, which can involve computing an informativeness weighted ranking for unlabeled observations by computing and ranking composite scores for the unlabeled observations such that the top ranked observations have relatively high relevance scores, relatively low typicality scores and relatively high uncertainty scores (block 701). The informativeness weighted ranking can be used to shape the data into diverse and ordered batches of unlabeled observations (block 703), which are stored in block 705 for use in manual labeling carried out by the labeling component 215. The operations of the data analysis component 213 can also involve computing a confidence weighted ranking for unlabeled observations by computing and ranking composite scores for the unlabeled observations such that the top ranked observations have relatively high relevance scores, relatively high typicality scores and relatively low uncertainty scores (block 707). The confidence weighted ranking can be used to shape the data into diverse and ordered batches of unlabeled observations (block 709), which are stored for use in the automatic labeling carried out by the labeling component 215. The operations of the data analysis component 213 can also involve computing a problematic weighted ranking for labeled observations by computing and ranking the labeled observations such that the top ranked labeled observations have relatively low relevance scores, relatively low typicality scores and relatively high uncertainty scores (block 711). The problematic weighted ranking can be used to shape the data into diverse and ordered batches of labeled observations (block 713), which are stored in block 715 for use in the label healing operations carried out by the labeling component 215. In each one of these cases, the composite scores can be computed from a weighted combination of relevance scores, typicality scores and uncertainty scores where weights are assigned to corresponding relevance scores, typicality scores and uncertainty scores in order to provide the relative weight of the corresponding score to the overall composite score. An example composite score is described below with respect to equation (4).

In embodiments, the framework 200 can also employ an oracle as part of the processes carried out by the labeling component 215 to establish ground truth for observations. In one embodiment shown in FIG. 8, the oracle can be one or more human annotators. In this embodiment, the labeling component 215 carries out a labeling task and a healing task.

Figure 9A:
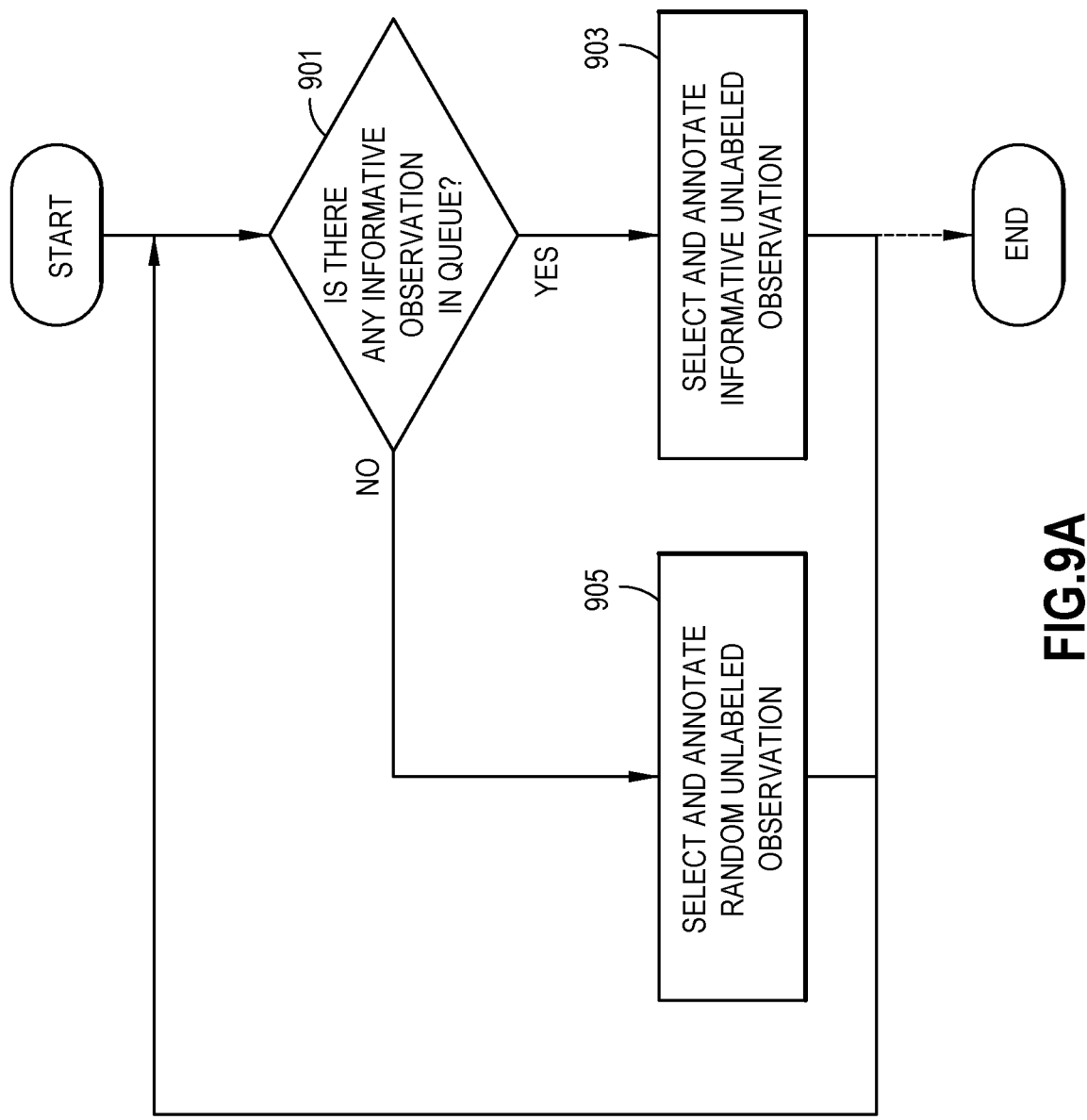
FIG. 9A is a flow chart of a labeling task that can be carried out by the labeling component of FIG. 8 in accordance with embodiments of the present disclosure.

In the labeling task, an unlabeled observation sampled by the data analysis component 213 (or possibly some other unlabeled observation that is manually or randomly selected) is loaded into the process in block 801, and the human annotator determines whether the unlabeled observation is relevant or not relevant in block 803. If the human annotator determines that the unlabeled observation is not relevant, the process saves the unlabeled observation in the pool of irrelevant data 207A. If the human annotator determines that the unlabeled observation is relevant, the process continues to block 811 where the unlabeled observation is added to a queue for manual label processing as shown in FIG. 9A. In such operations, the human annotator selects an informative observation from the queue (block 901) and manually annotates the selected observation (block 903). It is also possible for the human annotator to possibly select and annotate a random unlabeled observation in block 905. The labels (annotations) constructed by the human annotator are added to final label data 809.

Furthermore, the labeling operations can be machine learning aided where most confident labels can be automatically labeled without human input and added to the final label data 809. Second, it is also possible for the annotator to review one by one the least confident predicted labels (block 807) to decide whether it is valid and thus added to the final labeled data 809, or whether it should be rejected or discarded (block 810) and thus removed from the pool of labeled data 207C. The annotator can also possibly draw or otherwise construct labels if they are wrong or missing and such labels can be added to the final label data 809.

Figure 9B:
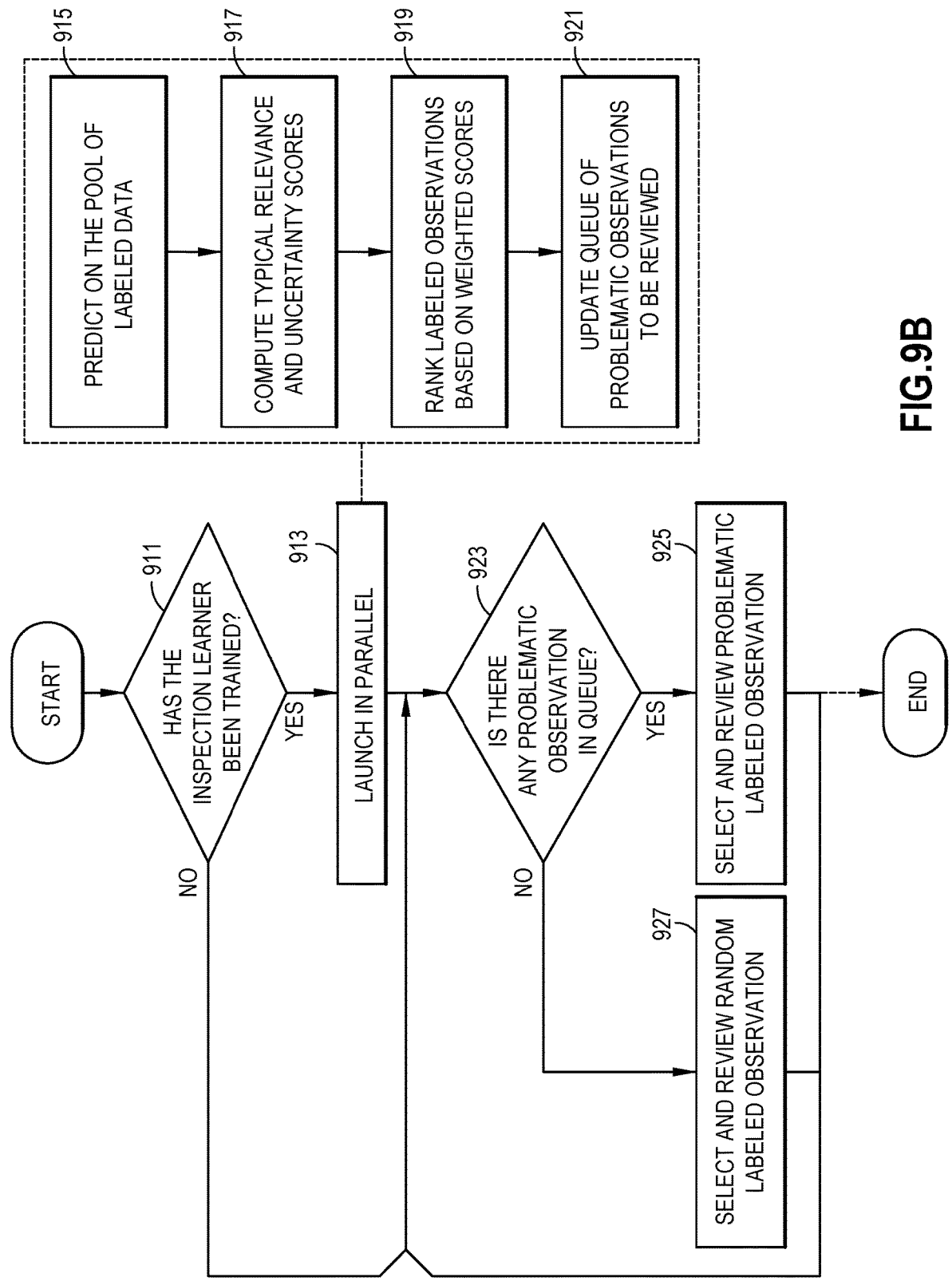
FIG. 9B is a flow chart of a healing task that can be carried out by the labeling component of FIG. 8 in accordance with embodiments of the present disclosure.

The healing task is shown in FIG. 9B. In block 911, the process checks whether the machine learning components 209 have been trained. If so, the operations continue to block 913 to launch the operations of blocks 915 to 921 for observations held in the pool of labeled data 207C Otherwise, the operations end. In block 915, each observation is processed by the trained machine learning components 209 to generate predictions. In block 917, the quality control components output relevance, uncertainty and typicality scores corresponding to the predictions and associated observation. In block 919, the data analysis component 213 computes one or more composite scores based on the relevance, uncertainty and typicality scores corresponding to the predictions and associated observation and ranks the observations based on the composite scores for the observations. In block 921, one or more problematic labeled observations can be identified within the ranked set of observations and added to a queue for review. In blocks 923 and 925 (block 807), the annotator can select a problematic labeled observation from the queue and review the selected problematic labeled observation to decide whether it is valid or whether it should be rejected or discarded (block 810) and thus removed from the pool of labeled data 207C. It is also possible for the human annotator to possibly select and review a random labeled observation in block 927 in order to decide whether it is valid or whether it should be rejected or discarded (block 810) and thus removed from the pool of labeled data 207C.

When the labeling and healing tasks are complete, the labels that are part of the final label data 809 (and the corresponding observation data) can be saved in the pool of labeled data 207C.

Note that the labeling and healing tasks can be performed asynchronously and thus can be run in parallel as part of the active learning phase. Furthermore, the framework is easily adaptable for the case of simulated data where labels are already available, but the challenge is selecting out of a very large quantity of observations which ones to train on. In this Human-In-the-Loop (HITL) component, the entire process can be optimized to obtain the most from the annotator(s) with the fewest interactions.

Figure 10:
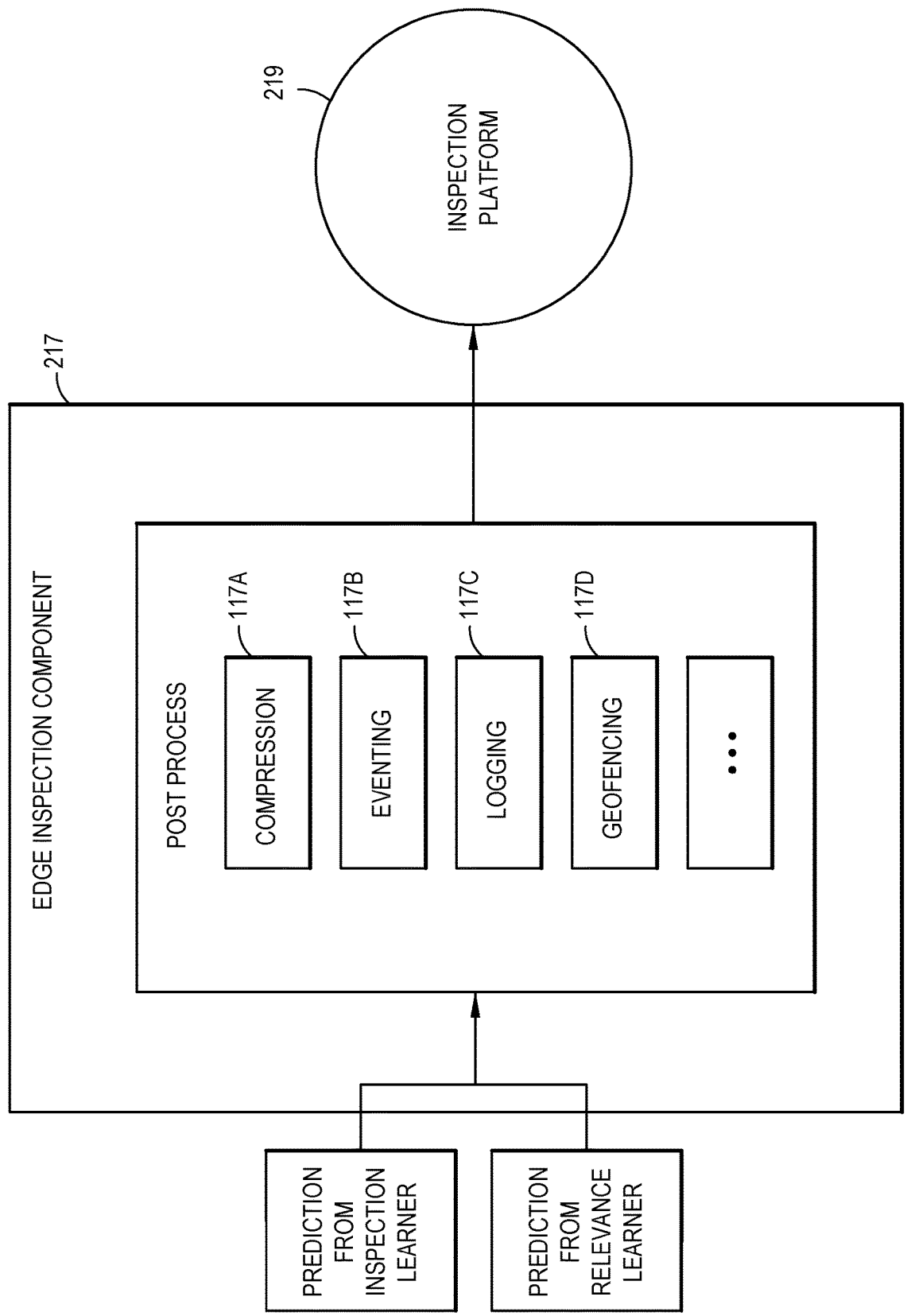
FIG. 10 is a schematic diagram illustrating an edge inspection component that is part of the active learning framework of FIG. 2A in accordance with embodiments of the present disclosure.

In embodiments, the framework 200 can also include edge inspection components 217 as shown in FIGS. 2A and 10. These components can include embedded hardware that incorporate one or more of the machine learning components 209 that have been trained by the framework 200 for use in carrying out the inspection task or process. Such integration can be part of the deployment operations of block 285 of FIG. 2B. For example, components 217 can incorporate the trained inspection learning component 209C to provide real-time solutions for given inspection tasks (compression, eventing, logging . . . ). Furthermore, the components 217 can incorporate the trained relevance learning component 209A to provide useful information to build even more sophisticated solutions.

For example, the inspection of subsea and above ground oil and gas facilities can involve a number of sensor modalities, such as video data captured by a video camera, three-dimensional point data (or a point cloud) captured by LiDAR, and acoustic data captured by sonar. One or more of the sensor modalities can be mounted to a remote-controlled submarine for subsea inspection or mounted on a UAV or drone for above ground inspection. In this case, the sensor modalities and the submarine or drone or UAV correspond to the inspection platform 219 of FIGS. 2A and 10. After one or more of the machine learning components 209 of framework 200 (such one or both of the relevance learning component 209A and the inspection learning component 209C) has been trained by operation of the active learning framework 200, such trained component(s) can be deployed as part of an embedded processing platform of the edge inspection components 217 of the vehicle (submarine or UAV or drone) that carries out the inspection task. The trained machine learning component(s) can be configured to process the sensor data output by the sensors of the vehicle for automatic object detection and classification with uncertainty. The functionality of the machine learning components(s) generates predicted labels corresponding to the sensor data. The predicted labels can be processed or otherwise used to configure or control various operations (such as data compression for data communication to a remote system, reporting or messaging events to a remote system, logging or storing data relevant to the inspection task, and controlling the navigation of the vehicle).

In another example, autonomous vehicles can involve a number of sensor modalities, such as video data captured by a video camera, three-dimensional point data (or a point cloud) captured by LiDAR, and radar data captured by radar. One or more of the sensor modalities can be mounted to a vehicle (such as car or truck or bus). In this case, the sensor modalities and the vehicle correspond to the inspection platform 219 of FIGS. 2A and 10. After one or more of the machine learning components of framework (such one or both of the relevance learning component and the inspection learning component) has been trained by operation of the active learning framework, such trained component(s) can be deployed as part of an embedded processing platform of the edge inspection components 217 of the vehicle. The trained machine learning component(s) can be configured to process the sensor data output by the sensors of the vehicle for automatic object detection and classification with uncertainty. The automatic object detection and classification function of the machine learning components(s) generates predicted labels corresponding to the sensor data. The predicted labels can be processed or otherwise used to configure or control various operations of the vehicle, such controlling the navigation of the vehicle.

In another example, medical imaging and computer-assisted surgery can involve a number of imaging modalities, such as video data captured by a video camera and three-dimensional and four-dimensional image data captured by computed tomography or CT or CAT scan, magnetic resonance imaging or MM, positron emission tomography or PET, ultrasound and/or x-rays. One or more of the imaging modalities can be integrated as part of a medical imaging system. In this case, the imaging modalities and the medical imaging system correspond to the inspection platform 219 of FIGS. 2A and 10. After one or more of the machine learning components of framework (such one or both of the relevance learning component and the inspection learning component) has been trained by operation of the active learning framework, such trained component(s) can be deployed as part of an embedded processing platform of the edge inspection components 217 of the medical imaging system. The trained machine learning component(s) can be configured to process the data output by the imaging modality(ies) of the system for automatic object detection and classification with uncertainty. The automatic object detection and classification function of the machine learning components(s) generates predicted labels corresponding to the image data. The predicted labels can be processed or otherwise used to configure or control various operations of the system, such reporting or messaging events to a user or remote system, logging or storing data relevant to the medical imaging task and controlling aspects of the system for computer-assisted surgery.

The framework can be used for any inspection task as long as it uses a human annotator to establish ground truth for the training data (e.g., segmentation, classification, human activity recognition . . . ) and can be extended to other domains (e.g., geophysics, medicine . . . ). Nevertheless, in the case of asset integrity inspection one of the most common inspection tasks involves object detection where objects (anomalies) are detected in a video stream.

In an embodiment, the active learning framework as described here can be configured to provide new and useful computation methods for typicality and uncertainty in the context of object detection where objects (anomalies) are detected in a video stream. In this scenario, the input data takes the form of video data and frames within the video data. The pre-processing component 205 can be configured to extract frames for the input video data with an adaptive extraction rate based on the optical flow so that the extracted frames are distinguishable. Then, anomalous frames (high blurriness, under/over-exposure . . . ) are filtered and stored as part of the pool of irrelevant data 207A, while good frames are stored in the pool of unlabeled data 207B and the pool of labeled data 207C according to whether labels were initially provided or not. The labels can include data that represents a bounding box (rectangular area in the pixel space of the video frame) with a class associated therewith. Each observation (frame) can contain multiple labels.

The classes that are associated with bound boxes as part of the labels depend on the particular inspection task. For example, for subsea inspection of oil and gas facilities, the classes can represent the following objects:

1—Strake
   a. Typical
   b. Damaged
   c. Missing
2—Fairing
   a. Typical
   b. Damaged
   c. Missing
3—Anode
4—Bullseye
5—Orientation level
6—Slide indicator
7—Umbilical buoyancy
8—Marine debris
9—Coating
   a. Damaged
10—Valve indication
   a. Open
   b. Closed
   c. Broken
11—Anode measurement
12—Buried flowline
13—Flowline Free span
14—Flowline joint
15—Insulation
   a. Cracked
   b. Damaged
16—Buoyancy
17—Corrosion
   a. Rust
18—Fishing line
19—Choke indicator
20—Cobra head
21—Jumper
   a. Damaged
22—CP reading In another example, for areal inspection of oil and gas facilities, the classes can represent the following objects:

1—Engine
2—Fuel tank
   a. Missing cap
3—Power end
4—Transmission
5—Fluid end
6—Radiator The inspection learning component can employ a computation model suitable for the object detection task. For example, in one embodiment, the computational model of the inspection learning component can employ a system of convolutional neural networks such as the Tiny Yolov3 object detector, which is subject to pre-training where 1000 epochs are trained on the initial training set with initial weights pretrained on the Imagenet database. The Tiny yolo v3 system needs a set of anchors to make detections. The anchors describe the sizes of the characteristic objects that will be detected. Therefore, the anchors can be optimized for the initial training set. In embodiments, the framework can include a single objector detector or an ensemble of object detectors. In the latter case, the pre-training can be repeated multiple times (such as three times) with slightly different anchors each time to ensure the asymmetry of the object detectors. During the training phase of the framework, each object detector can be trained for 150 epochs every loop (iteration of the training phase) by adjusting or fine-tuning on the final weights of the previous loop (training isn't restarted from scratch each loop). For the training phase as well as for predictions (inference) generated in the active learning phase, the frames (observations) can be resized to 960*960 to cope with the high number of relatively small sized and packed labels per frame.

The relevance learning component can employ a computation model suitable for the object detection task. For example, in one embodiment, the computational model of the relevance learning component can employ a convolutional neural network for binary classification with weights pre-trained on a large visual database. For example, the convolutional neural network "tiny darknet" can be used as a binary classifier, which is subject to pre-training employing 500 epochs on an initial relevance training set with weights pre-trained on the Imagenet database. During the training phase, the relevance learning component can be trained for 40 epochs every loop by adjusting or fine-tuning the final weights of the previous loop. For the training phase as well as for predictions (inference) generated in the active learning phase, the frames (observations) can be resized to 224*224 in order to capture global context rather than intricate details in object detection.

The typicality learning component can employ a computation model suitable for the object detection task. For example, in one embodiment, the computational model of the typicality learning component can employ a feature extractor and a one class classifier. The feature extractor can be configured to extract deep features from labels representation frames of a size 128*128 using the VGG16 model (see Simonyan et al., "Very deep convolutional networks for large-scale image recognition", CoRR, abs/1409.1556, 2014) with weights pretrained using the Imagenet database. The classifier can be embodied by a One-Class Support Vector Machine (SVM). An example of such a One-Class SVBM is described in Scholkopf et al., "Support vector method for novelty detection," Advances in Neural Information Processing Systems 12, pages 582-588, 1999. The SVM can use a radial basis function (RBF) kernel to estimate the support of the highly-dimensional distribution of training features.

The typicality learning component can be trained to identify labels produced by the inspection learning component which are diverging from the distribution of labels provided by the human annotator. Atypical labels are likely to reflect over-confident mispredictions and missed predictions. In one embodiment, such labels can be identified by first converting the labels into unified objects. For example, the unified objects can be images which we refer to as label representation images. This is advantageous because an image maintains spatial information and it is convenient for extracting features. Alternatively, the unified objects can possibly be sequences. However, extracting overall features from a sequence is not as straightforward. The label representation images can be drawn by overlapping boxes by transparency where the level of transparency (alpha channel) is set in accordance with the maximal number of overlapping boxes and the color appearance (hue) is different for every class. In the training phase, the labels for the training set (i.e., the labeled observations in the pool of labeled data 207C) are first converted into their label representation images. Then, for each label representation image, a convolutional neural network with weights pre-trained on a large visual database (such as Imagenet) is used to extract a feature vector. Finally, a one-class classifier, such as a one-class SVM (since we have typical labels examples only) is trained to learn what features are typical. In the active learning phase where the typicality learning component is used for predictions (interference) based on the predicted labels output by the inspection learning component, the predicted labels output from the inspection learning component can be subject to thresholding and then converted into the unified object such as the label representation image. The unified object (e.g., label representation image) is input to the convolutional neural network trained for feature extraction, and the resulting features are processed by the one-class classifier. The output of the one-class classifier can be used to generate the typicality score. In embodiments, the typicality score can be computed from the signed distance to the separating hyperplane.

Figure 11:
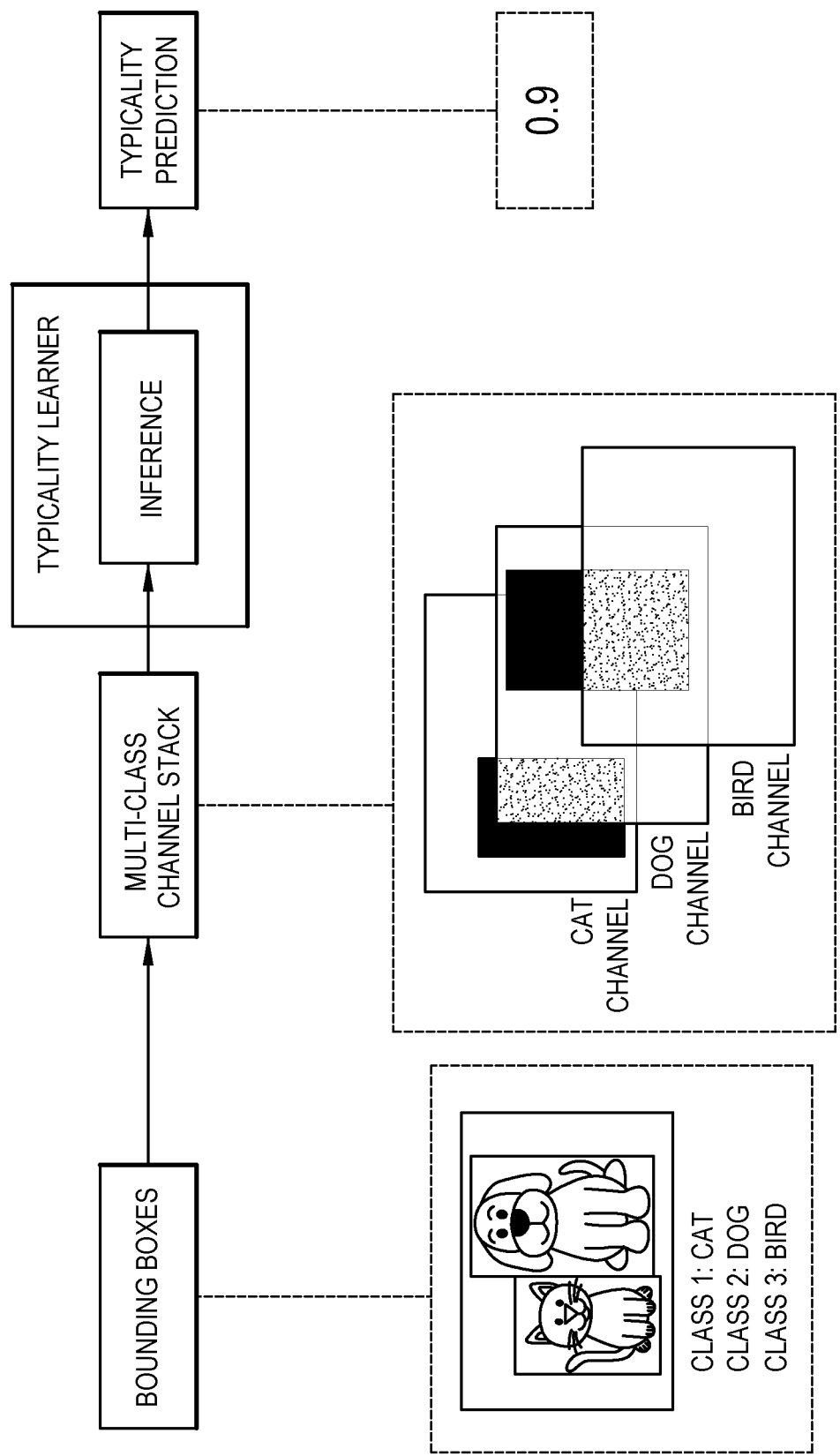
FIG. 11 is a schematic diagram illustrating operations of a typicality learning component that is part of the active learning framework of FIG. 2A in accordance with embodiments of the present disclosure.

FIG. 11 illustrates the methodology of the typicality learning component in computing typicality predictions from labels. First, a multi-class channel stack is extracted from the bounding boxes of a label representation. The multi-class channel stack is an ensemble of channels where every channel corresponds to one of the classes of the label. Each channel is obtained by summing rectangles of ones in place of each bounding box pertaining to the corresponding class. Using stacks to represent bounding boxes is very convenient because, like images, stacks hold spatial information and can easily be fed into a neural network. Moreover, it's an efficient way of representing labels: information is preserved, and the machine learning component can identify recurrent spatial arrangements among objects by training on labels from the pool of labeled data.

Figure 12:
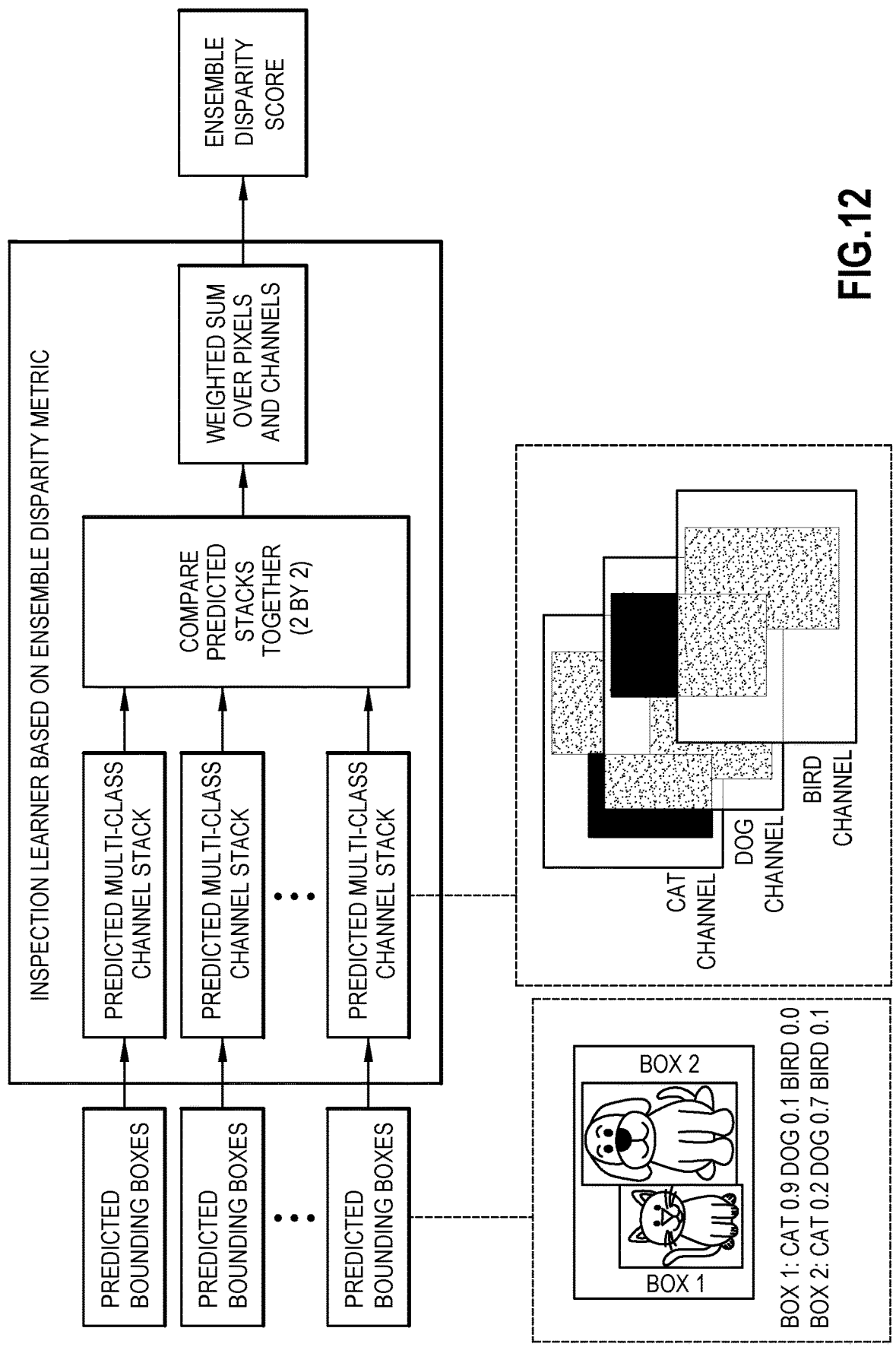
FIG. 12 is a schematic diagram illustrating operations of an inspection learning component that is used to produce an ensemble disparity metric as part of the active learning framework of FIG. 2A in accordance with embodiments of the present disclosure.

In embodiments, the inspection learning component can employ an ensemble of object detectors. In a non-limiting example, real time object detection may be used. See "You Only Look Once: Unified, Real-Time Object Detection," Proceedings of the IEEE conference on computer vision and pattern recognition, 2016. The ensemble of object detectors can be used to compute an ensemble disparity metric as shown in FIG. 12. In this case, each object detector of the ensemble of object detectors computes a predicted multi-class channel stack from the detector output prediction. The predicted multi-class channel stacks are similar to the multi-class channel stacks described above for the typicality learning component, but they sum rectangles of class predictions instead of rectangles of ones. So for each class c, each object detector k and pixel (i,j), a stack element $s_k^c(i,j)$ is extracted. The pixel-wise ensemble disparity score can be computed according to equation (1) below:

$$d^c(i, j) = \frac{\sum_{k,k'} \|s_k^c(i, j) - s_{k'}^c(i, j)\|}{\sum_{k,k'} 1} \qquad \text{Eqn. (1)}$$

Then the overall ensemble disparity score can be computed according to equation (2) below:

$$D = \frac{\sum_{i,j}\left[w(i,j) * \sum_c d^c(i,j)\right]}{I * J * C * B} \quad \text{Eqn. (2)}$$

where weights w(i,j) are the mean bounding box area per pixel (as we sum over pixels, disparity is weighted so that comparable relative errors on small and big bounding boxes have the same impact);

I is the height of the frame (in pixels);

J is the width of the frame (in pixels);

C is the number of classes; and

B is the average number of bounding boxes (so that images with lots of objects are not prioritized over images with few but very informative objects, if B is 0 the ensemble disparity is set to 0).

Note that the computations compare predicted multi-class channel stacks for multiple boxes proposals. Such computations can be more efficient than using IoU among proposals to evaluate the quality of the predictions of the inspection learning component because:

(a) the predicted multi-class channel stacks are robust to occlusions as they describe multiple objects at the same time, whereas IoU can mix up objects when they are too similar.

(b) the predicted multi-class channel stacks are robust to breakdowns. There is not always a unique way of labeling objects. Sometimes objects boundaries are ambiguous and multiple representations are acceptable. According to the level of detail, labels given by the annotator can be slightly different. The inspection learner will most likely output various representations as well. If one object is broken into multiple objects IoU will fail. However, with predicted multi-class channel stacks, as predictions are compared at the pixel level we can still identify when labels follow the same tendency even though they are not exactly the same.

(c) the predicted multi-class channel stacks are a unique and effective way to represent labels and they can be easily compared (matrix computations). On the other hand, IoU requires to find, filter and order pairs which is less straightforward.

The inspection learning component can also be configured to compute a traditional entropy score or metric as it gives complementary information.

The inspection learning component can also be configured to compute a cut-off entropy score or metric, which is the mean of a fraction of the highest entropies in one image. With Btop(p) the top p percentage of bounding boxes with regard to single box entropy value, a cut-out entropy score $S_{coent}$ can be computed according to:

$$S_{coent} := -\frac{1}{p \cdot n_b} \sum_{b \in B_{top}(p)} \sum_k c_k(b) \cdot \log(c_k(b)) \quad \text{Eqn. (3)}$$

where $c_k(b)$ is confidence score of bounding box b on class k, and $n_b$ is the number of bounding boxes for a given image.

In an embodiment, the data analysis component 213 can be configured to generate an informativeness weighted ranking for an unlabeled observation based on a composite or overall score computed according to:

$$S_{overall} = \lambda_r \cdot S_{rel} + \lambda_t \cdot S_{typ} + \lambda_e \cdot S_{coent} + \lambda_d \cdot S_{disp} \quad \text{Eqn. (4)}$$

where $S_{overall}$ is the composite or overall score, $S_{rel}$ is the relevance score computed from the prediction of the relevance learning component for the unlabeled observation, $\lambda_r$ is the weight value associated with the relevance score $S_{rel}$, $S_{typ}$ is the typicality score computed from the prediction of the typicality learning component for the unlabeled observation, $\lambda_t$ is the weight value associated with the typicality score $S_{typ}$, $S_{coent}$ is the cut-off entropy score computed from the prediction of the inspection learning component for the unlabeled observation (see Eqn. 3)), $\lambda_e$ is the weight value associated with the cut-off entropy score $S_{coent}$ $S_{disp}$ is the ensemble disparity score computed from the prediction of the inspection learning component for the unlabeled observation (see Eqn. (2)), and $\lambda_d$ is the weight value associated with the ensemble disparity score $S_{disp}$.

Note that $\lambda_t$ can be given a negative value so that images with atypical predicted labels are more likely to be sampled. In one embodiment, $(\lambda_r, \lambda_t, \lambda_e, \lambda_d)$ can be set to (3,−1, 1,1) in Eqn. (4).

In embodiments, the labeling component 215 can be configured such that the annotator specifies a label for a frame observation by choosing a class label and selecting opposite corners of a box that is overlaid on the observation. Horizontal and vertical lines help the annotator tightly adjust the box to the object.

M embodiments, the edge inspection components 217 of the framework for object detection can include but are not limited to: compression (block 117A), eventing (block 117B), logging (block 117C) and geofencing (block 117D).

In compression (block 117A), the objects detected by the trained inspection learning component can be used for adaptive compression. For example, detected objects can be considered as foreground and communicated to a remote system with a higher bit rate, as opposed to background data that will be highly compressed.

In the case of eventing (block 117B), an object (feature) detected by the trained inspection learning component can be used to track the feature for path planning.

In the case of logging (block 117C), instead of manually tracing anomalies occurrences on paper, the objects detected by the trained inspection learning component can be used automatically to generate a report.

In the case of geofencing (block 117D), the trained relevance learning component and the trained inspection learning component can cooperate to filter out observations (frames) that are irrelevant. Moreover, the geofencing can indicate to the pilot/auto-pilot of the vehicle that it is out of the inspection scope.

In the specific use case of subsea asset integrity inspection, the vehicle speed during the inspection of tubular structures (pipelines, risers) is typically constrained by the human pilot responsiveness and post-job diagnosis comfort, disregarding optimal information gain by an automated framework. One or more trained machine learning components that result from the active learning framework can be used in real-time in an embedded mode (at the edge) in order to compress the mission duration whilst maximizing the detection likelihood of features of interest. This entails controlling the speed of the vehicle based on features present in the field of view or features further ahead below the path of the vehicle detected by other sensors.

In other embodiments, the plurality of machine learning components can include the following: i) an inspection (or primary) learning component, ii) a typicality learning component, and iii) a density learning component. The inspection learning component employs a computation model that is trained to predict a label associated with an unlabeled observation supplied as input to the computation model and generate at least one uncertainty score associated with the predicted label. The at least one uncertainty score characterizes the confidence level for the associated predicted label and/or the reproducibility of the associated unlabeled observation. The typicality learning component employs a computation model that is trained to generate a typicality score associated with a predicted label output by the inspection learning component and supplied as input to the computational model. The typicality score characterizes the level of divergence of the predicted label associated therewith relative to the distribution of labels in a pool of labeled observations. The density learning component includes a computational model that is pretrained to generate a density score associated with a particular unlabeled observation. The density score characterizes similarity of the particular unlabeled observation relative to a set of other observations. The set of other observations does not include the particular unlabeled observation. The set of other observations can include labeled observations and possibly other unlabeled observations that are different from the particular unlabeled observation. The density score is intended to identify whether the particular unlabeled observation is an inlier with respect to the set of other observations. The framework can also include a quality control component that computes and outputs a relevance score based upon the prediction output by the inspection earning component. The computation of the relevance score can be configured such that the resultant relevance score discriminates off-the-point observations that could confuse both the human annotator(s) and the inspection learning component 209C' if they were to be labeled. The framework generates one or more composite scores for a particular unlabeled observation based on at least one uncertainty score for the predicted label associated with the particular unlabeled observation, the typicality score for the predicted label associated with the particular unlabeled observation, the relevance score for the predicted label associated with the particular unlabeled observation, and the density score for the particular unlabeled observation. The composite scores associated with unlabeled observations can be used to control the sampling (or selection) of the unlabeled observations for labeling. In embodiments, such sampling control can be biased to sample informative observations for manual labeling involving at least one human annotator as described herein. The sampling control can also be biased to sample confident observations for automatic labeling (without a human annotator) as described herein. The sampling control can also be biased to sample problematic observations for healing as described herein.

Figure 14B:
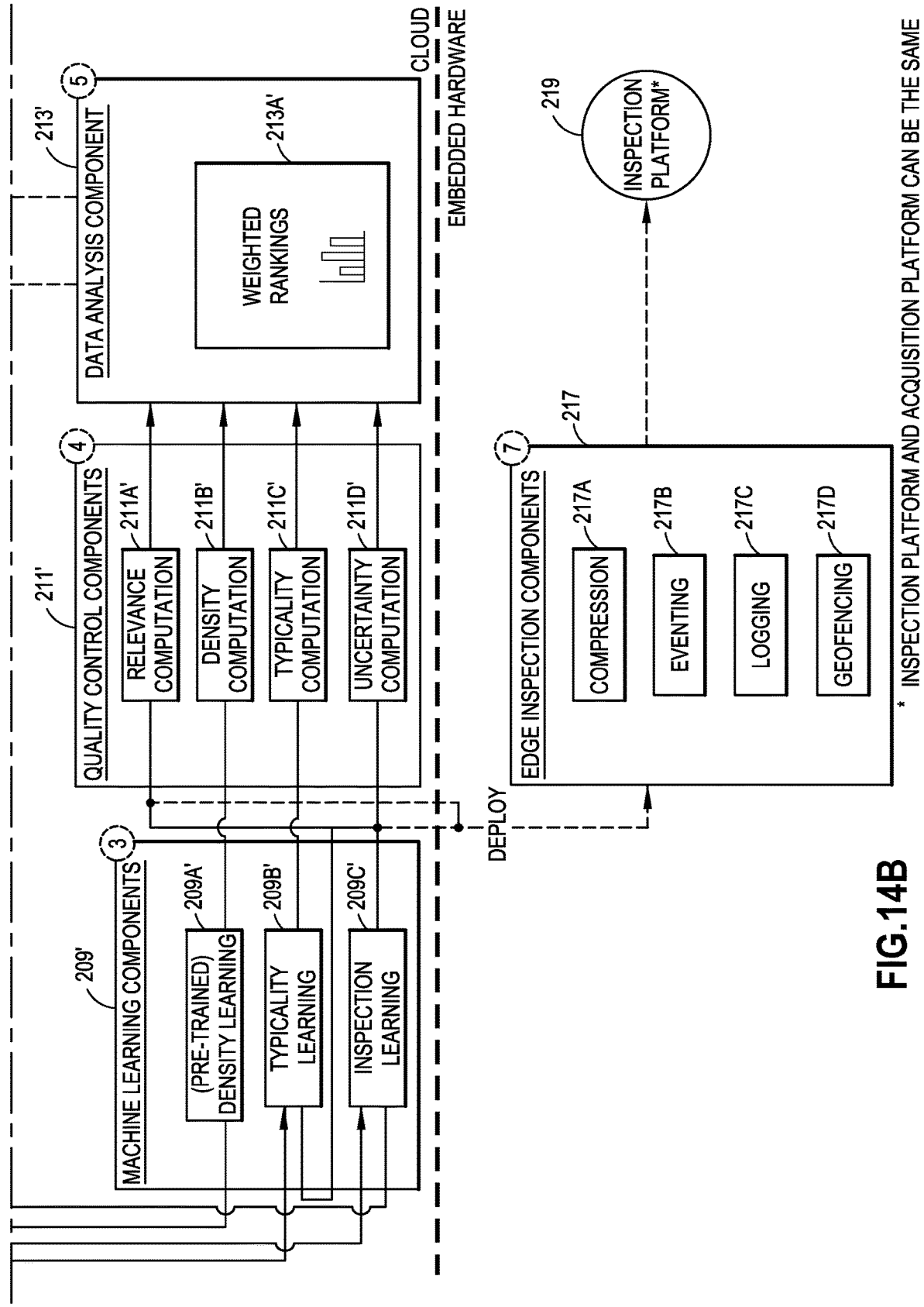
FIG. 14 is a schematic block diagram of another embodiment of an active learning framework in accordance with the present disclosure.

FIG. 14 is a functional block diagram that illustrates an embodiment of an active learning framework 200' for a machine learning system that is trained for use in a machine-assisted inspection task or process. The framework 200' covers all the steps from the acquisition of the training data (acquisition platform: automated underwater vehicle, remotely operated vehicle, drone . . . ) to the deployment of the trained inspection learner on edge-based platforms (NVIDIA® Jetson™ TX2/Xavier, INTEL® Movidius™ . . . ) to analyze and post-process live observations. The operations carried out by the components of the active learning framework 200' are similar to those illustrated in the flowchart of FIG. 2B and described above.

The framework 200' includes components with like numbers as described above with respect to the framework 200, with differences in the set of machine learning components, the quality control components and the data analysis components of the framework.

Specifically, the framework 200' includes a set of machine learning components (labeled 209'), which include a density learning component 209A', a typicality learning component 209B' and the inspection learning component 209C'. The density learning component 209A' can be pretrained (prior to the training phases and active learning phases) using a pre-existing database of labeled observations (images), such as the publicly-available ImageNet database. The architecture of the density learning component 209A' can depend on the machine-assisted task as well as the deployment edge hardware components 217. In one embodiment, the architecture of the density learning component 209A' can employ a convolutional neural network pretrained for extraction of features in an unlabeled observation (image) that is supplied as input to the convolutional neural network. In other embodiments, the density learning component 209A' can employ other neural network architectures, such as an ensemble of learners and a Bayesian neural network (BNN).

In embodiments, the typicality learning component 209B' can be trained on the labels of the observations from the pool of labeled data 207C. The typicality learning component 209B' can be embodied by a suitable one-class classifier in the case that the framework 200 employs only positive typicality (typical) samples. The typicality learning component 209B' can be configured to identify labels deviating from a given distribution of labels. The architecture of the typicality learning component 209B' depends on the shape of labels and therefore on the inspection task. One example will be given for the object detection use-case below, but it can readily be adapted to handle any label structure.

In embodiments, the inspection learning component 209C' can be trained on the pool of labeled observations. The architecture of the inspection learning component 209C' can depend on the inspection task as well as the deployment edge hardware components 217. Furthermore, based on the metrics chosen for the uncertainty computation, the inspection learning component 209C' can be modified to generate better uncertainty measurements, such as by employing an ensemble of learners, a Bayesian neural network (BNN) instead of convolutional neural networks (CNN), or by introducing Monte Carlo dropout.

The typicality learning component 209B' and the inspection learning component 209C' can be trained during the training phase (e.g., similar to blocks 255 to 261 of FIG. 2B) or during the final training (similar to block 283 of FIG. 2B), and can be used for predictions in the active learning phase (e.g., similar to blocks 265 to 279 of FIG. 2B).

In embodiments, the framework 200' can also include a set of quality control components 211' that provide various scores or metrics to gauge the quality of an unlabeled observation. The scores or metrics provided by the set of quality control components can be copied, computed, derived or otherwise determined from the scores or other data output from the set of machine learning components 209'. These scores will later be fed into the data analysis component 213' to compute composite scores and overall rankings for a number of unlabeled observations.

In embodiments, the set of quality control components 211' includes a quality control component 211A' that computes and outputs a relevance score based upon the prediction output by the inspection learning component 209C'. The computation of the relevance score can be configured such that the resultant relevance score discriminates off-the-point observations that could confuse both the human annotator(s) and the inspection learning component 209C' if they were to be labeled.

In embodiments, the relevance score for a particular prediction output by the inspection learning component 209C' can be computed from the probability of a particular prediction as output by the inspection learning component 209C'. For example, where the inspection learning component 209C' outputs bounding boxes coordinates as well as probabilities of classes for each bounding box, the relevance score can be given by the following:

$$p_{relevant}(x) = \max_{b \in B_x}\left(1 - \prod_{i \in c}(1 - p_{b,i})\right) \quad \text{Eqn. (5)} \quad (1)$$

where x an image from the unlabeled set, $B_x$ is the set of bounding boxes of x, c is the set of classes, and $p_{b,i}$ is the probability of bounding box b being class i.

In embodiments, the set of quality control components 211' can also include a quality control component 211B' that outputs a density score for an unlabeled observation supplied thereto. The density score can be derived by operation of the pretrained density learning component 209A'.

Figure 15:
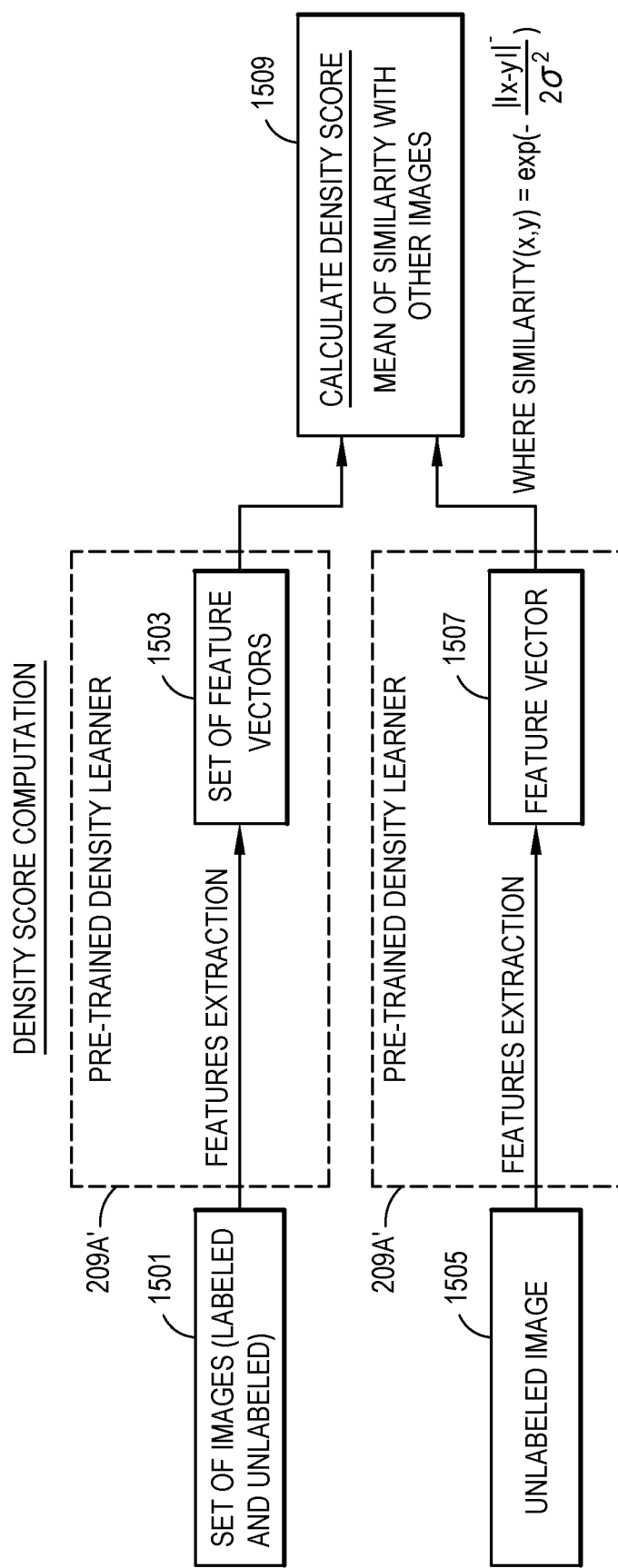
FIG. 15 is a schematic diagram illustrating operations that calculate a density score as part of the active learning framework of FIG. 14 in accordance with embodiments of the present disclosure.

FIG. 15 illustrates operations that can be part of the computation of the density score where a set of other images 1501 are supplied as inputs (one-by-one) to the pretrained density learning component 209A', which employs machine learning inference to generate a set of feature vectors 1503 for the set of other images. The feature vector extracted from a particular other image includes data values that represents features extracted from the particular other image. A candidate unlabeled image 1505 is selected and supplied as an input to the pretrained density learning component 209A', which employs machine learning inference to generate a feature vector 1507 for the candidate unlabeled image. The feature vector extracted from the candidate unlabeled image includes data values that represents features extracted from the candidate unlabeled image. The set of other images does not include the candidate unlabeled image and can be labeled images from the pool of labeled data 207C and possibly other unlabeled images taken from the pool of unlabeled data 207B that are different from the candidate unlabeled image. In block 1509, the set of feature vectors (1503) and the feature vector (1507) for the candidate unlabeled image are processed to compute a density score for the candidate unlabeled image. For example, each feature vector in the set (1503) can be compared to the feature vector (1507) for the candidate unlabeled image using a gaussian kernel similarity function and the results combined to compute a density score for the candidate unlabeled image. An example of such a gaussian kernel similarity function can be given as:

$$\text{similarity}(x, y) = \exp\left(-\frac{\|x - y\|^2}{2\sigma^2}\right) \quad \text{Eqn. (6)}$$

where x and y are feature vectors and $\sigma^2$ is a scaling parameter.

Other similarity functions, such as cosine functions, can also be used if desired. This process can be repeated for multiple candidate unlabeled images. When processing a batch of candidate unlabeled images, the extraction of the features vectors for each candidate unlabeled image of the batch can be performed together, and the feature vector similarity processing and computation of the density score for a respective candidate unlabeled image can be configured by selecting the appropriate feature vectors produced from the unlabeled images that are different that the respective candidate unlabeled image. When processing candidate unlabeled images in a sequential manner, after extracting the feature vector for a candidate unlabeled image, the feature vector can be added to the set of feature vectors (1507) for subsequent processing.

In embodiments, the set of quality control components 211' can also include a quality control component 211C' that outputs a typicality score based upon the prediction output by the typicality learning component 209B. The typicality score indicates how much the prediction of the inspection learning component 209C' deviates from the distribution of labels in the pool of labeled data 207C by analyzing its inner-structure.

Figure 16:
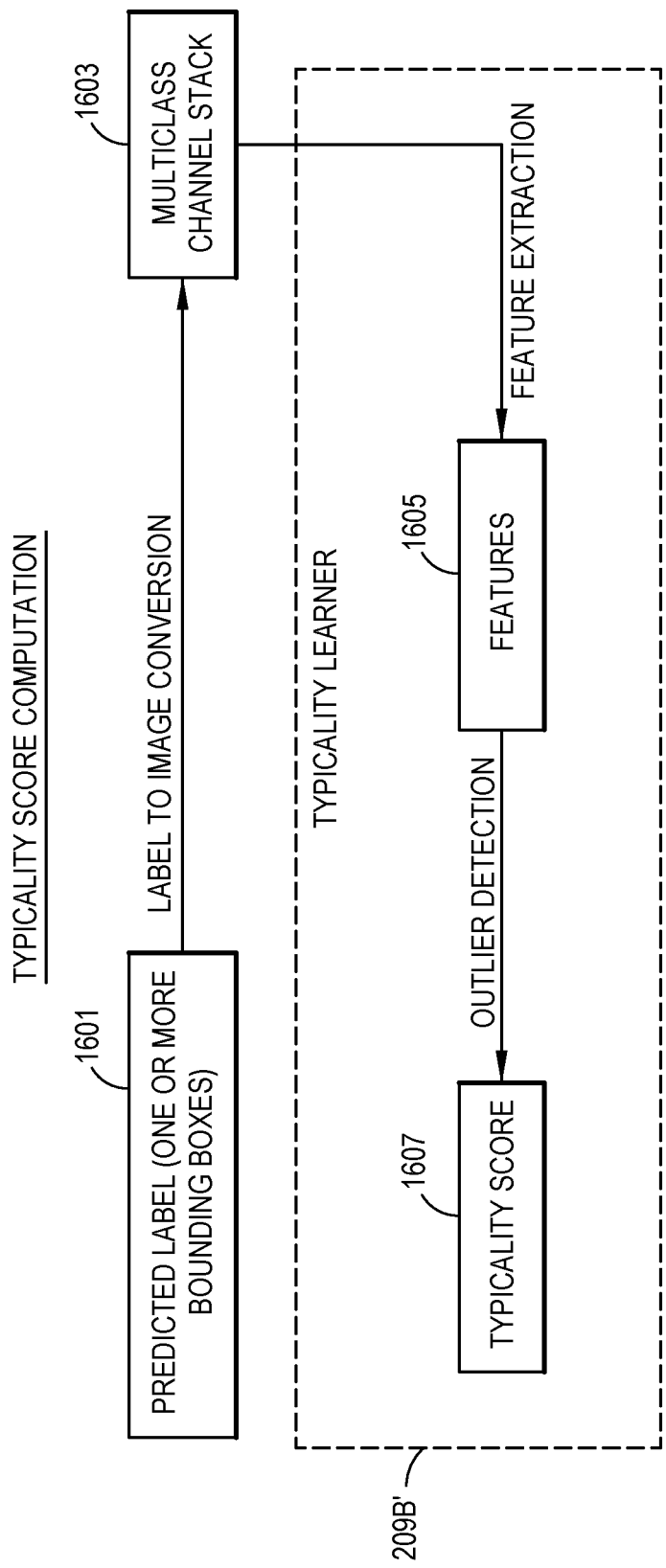
FIG. 16 is a schematic diagram illustrating operations that calculate a typicality score as part of the active learning framework of FIG. 14 in accordance with embodiments of the present disclosure.

FIG. 16 illustrates operations that can be part of the computation of the typicality score, where a predicted label 1601 output by the inspection learning component 209C' (e.g., one or more bounding boxes with associated uncertainty score(s)) are converted to a multi-class channel stack 1603, for example as described above with respect to FIG. 13. The multi-class channel stack 1603 is supplied as input to the typicality learner component 209B', which employs machine learning inference to extract features (1605) and detect feature outliers or localization errors in generating a typicality score (1607) for the predicted label 1601.

In embodiments, the set of quality control components 211' can also include a quality control component 211D' that outputs one or more uncertainty scores based upon the prediction output by the inspection learning component 209C'. The uncertainty score(s) indicate a level of confidence in the prediction generated by the inspection learning component 209C.' Various uncertainty scores or metrics can be implemented depending on the architecture of the inspection learning component 209C'.

In embodiments, the computation of the uncertainty score(s) can employ entropy sampling which is configured to measure the different entropies that are obtained from each bounding box predicted on an image and select the maximum of those entropies. Furthermore, the computation of the uncertainty score(s) can use deep snapshots ensembles to improve the accuracy of this metric. Instead of averaging the outputs of multiple object detectors, and then computing entropy on the outputs, the outputs of the multiple object detectors for a particular image can be merged by first computing the maximum entropy of the entropy scores of all bounding boxes for each object detector separately, and second averaging the maximum entropy scores for the multiple object detectors to provide a more precise metric. Such computations can be represented mathematically as:

$$\text{uncertainty}(x) = \frac{1}{N}\sum_{d \in D}\max_{b \in B_x}(\text{entropy}(b)) \quad \text{Eqn. (7a)}$$

$$\text{entropy}(b) = \sum_{i \in C}-p_{b,i}\log(p_{b,i}) - (1 - p_{b,i})\log(1 - p_{b,i}) \quad \text{Eqn. (7b)}$$

where x an image from the unlabeled set, $B_x$ is the set of bounding boxes of x, C is the set of classes, D is the set of object detectors (snapshots), and $p_{b,i}$ is the probability of bounding box b being class i.

Note that the entropy scores for a given object detector, which is denoted entropy(b), is a sum of entropy computed separately for each class for the case that the object detector outputs probabilities from a logistic regression for each class separately.

In embodiments, the framework 200' can also include a data analysis component 213' that computes one or more composite scores for an unlabeled observation based on the scores or metrics provided by the quality control components 211'. The data analysis component 213' can also use the composite scores for a number of unlabeled observations to rank the unlabeled observations (for example, in a weighted ranking).

M embodiments, the composite scores and ranking provided by the data analysis component 213' as well as the sampling of the labeling component 215 can be configured such that informative observations are sampled (or selected) to be labeled by the human annotator(s). In one example, the informative observations can include one or more unlabeled observations which are highly relevant (e.g., have relatively high relevance scores) and which are highly representative (e.g., have a relatively high density score) and on which the inspection learning component 209C' performs badly (e.g., have relatively high uncertainty scores and relatively low typicality scores) and thus from which we expect to learn the most when annotated. Furthermore, because the observations are sampled in batches, it is desirable that the informative observations be diverse so that multiple weaknesses of the inspection learning component 209C' are tackled at the same time.

Furthermore, the composite scores and ranking provided by the data analysis component 213' as well as the sampling of the labeling component 215 can be configured such that a batch of confident observations are automatically labeled without human input (by an auto-labeler). For example, the confident observations can include one or more unlabeled observations which are relevant (e.g., have a relatively high relevance score), representative (e.g., have a relatively high-density score), typical (e.g., have a relatively high typicality score) and have low uncertainty (e.g., have a relatively low uncertainty score). In the case that the observations are sampled in batches, it is desirable that the confident observations be diverse so that they cover a variety of situations. In embodiments, the labels generated by the auto-labeler can be temporary (for example, valid for one loop) and may be weighted (to have less impact on training) so that they don't have an impact if they are incorrect. The weights may be adjusted as the inspection learning component 209C' learns. Furthermore, a diversity criterion can be used to select observations for automatic labeling.

Furthermore, the labeling component 215 can be configured such that one or more problematic labeled observations stored in the pool of labeled data 207C can be selected for healing where human annotator(s) heal the labeled observation(s) by updating the corresponding label(s). For example, the problematic labeled observations can include one or more labeled observations which are likely to be bad because they are irrelevant (e.g., have a relatively low relevance score) or not representative (e.g., have a relatively low density score), or because their label is wrong (e.g., have a relative low typicality score and/or a relatively high uncertainty score). In the case of labeled data sampling, metrics can be generated by the machine learning components 209' and associated quality control components 211' to serve the purpose of sampling for the healing process. In this case, an uncertainty metric can be based on the loss of the inspection learning component 209C', a relevance score can be determined in a manner like that described above, and a typicality score and density score can be determined in a manner similar to that described above for a given problematic label.

Figure 17:
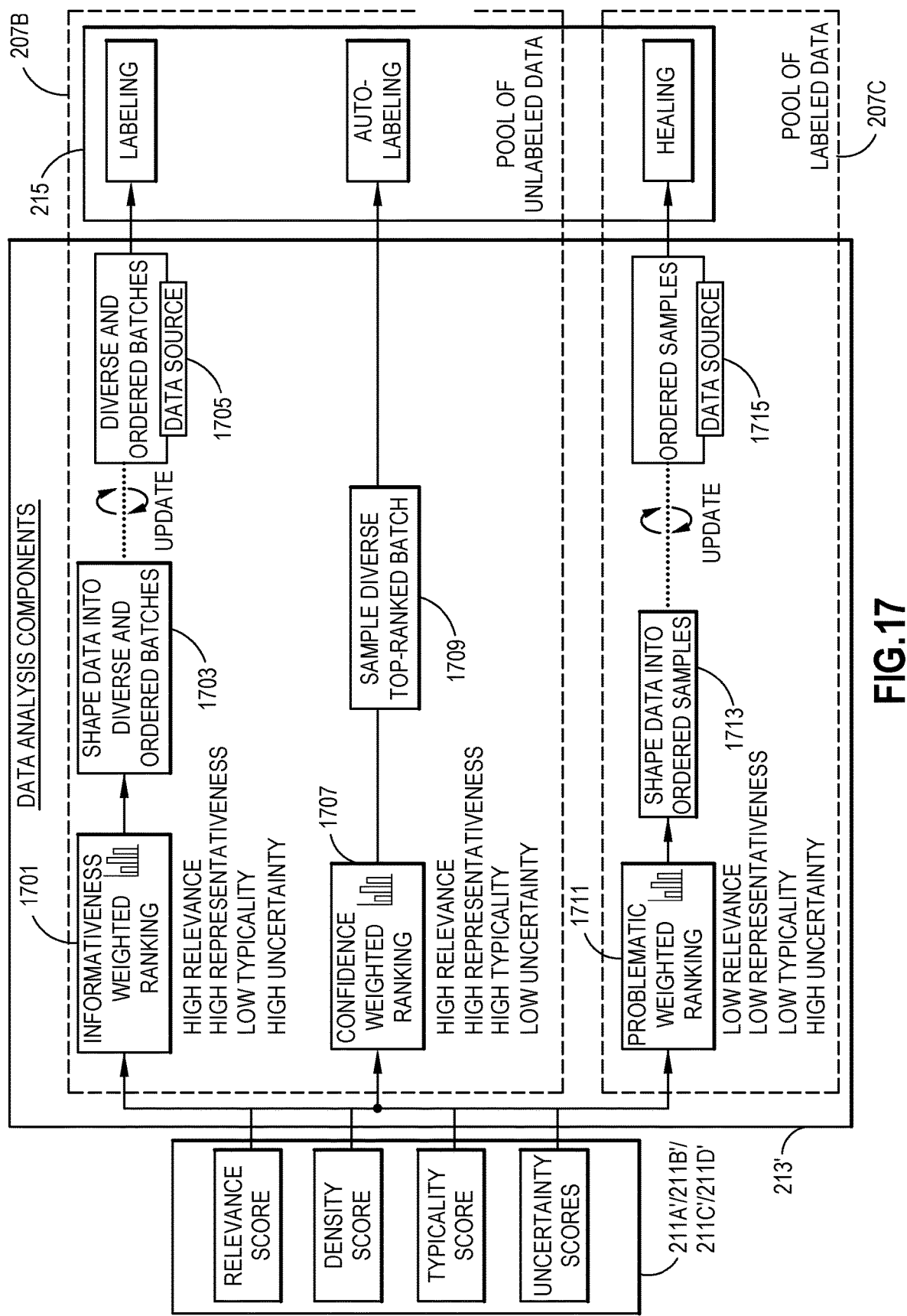
FIG. 17 is a schematic diagram illustrating a data analysis component that is part of the active learning framework of FIG. 14 in accordance with embodiments of the present disclosure.
Figure 18:
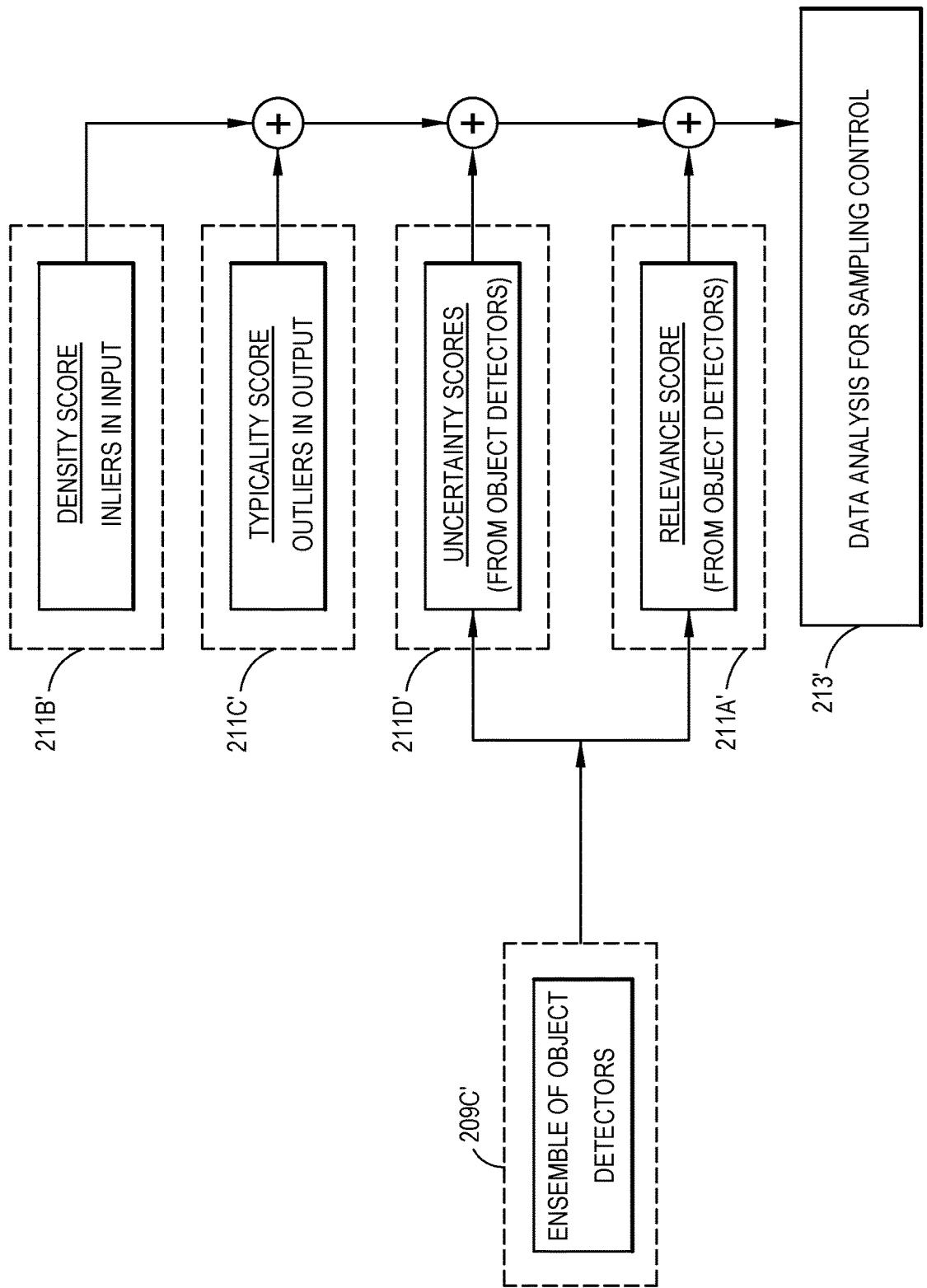
FIG. 18 is schematic diagram illustrating operations that calculate a composite score as part of the active learning framework of FIG. 14 in accordance with embodiments of the present disclosure.

FIG. 17 depicts exemplary operations of the data analysis component 213', which can involve computing an informativeness weighted ranking for unlabeled observations by computing and ranking composite scores for the unlabeled observations such that the top ranked observations have relatively high relevance scores, relatively high-density scores, relatively low typicality scores and relatively high uncertainty scores (block 1701). The informativeness weighted ranking can be used to shape the data into diverse and ordered batches of unlabeled observations (block 1703), which are stored in block 1705 for use in manual labeling carried out by the labeling component 215. The operations of the data analysis component 213' can also involve computing a confidence weighted ranking for unlabeled observations by computing and ranking composite scores for the unlabeled observations such that the top ranked observations have relatively high relevance scores, relatively high-density scores, relatively high typicality scores and relatively low uncertainty scores (block 1707). The confidence weighted ranking can be used to shape the data into diverse and ordered batches of unlabeled observations (block 1709), which are stored for use in the automatic labeling carried out by the labeling component 215. The operations of the data analysis component 213' can also involve computing a problematic weighted ranking for labeled observations by computing and ranking the labeled observations such that the top ranked labeled observations have relatively low relevance scores, relatively low-density scores, relatively low typicality scores and relatively high uncertainty scores (block 1711). The problematic weighted ranking can be used to shape the data into diverse and ordered batches of labeled observations (block 1713), which are stored in block 1715 for use in the label healing operations carried out by the labeling component 215. In each one of these cases, the composite scores can be computed from a weighted combination of relevance scores, density scores. typicality scores and uncertainty scores where weights are assigned to corresponding relevance scores, density scores, typicality scores and uncertainty scores in order to provide the relative weight of the corresponding score to the overall composite score. An example computation of a composite score is shown in FIG. 18.

Embodiments of the subject disclosure may be used for any asset inspection which includes hardware underwater and onshore. Embodiments of the subject disclosure may be used for any inspection task in any field including the medical field and manufacturing. Finally, embodiments of the subject disclosure may be used for any interpretation task. Non-limiting examples include seismic interpretation and log interpretation.

Figure 13:
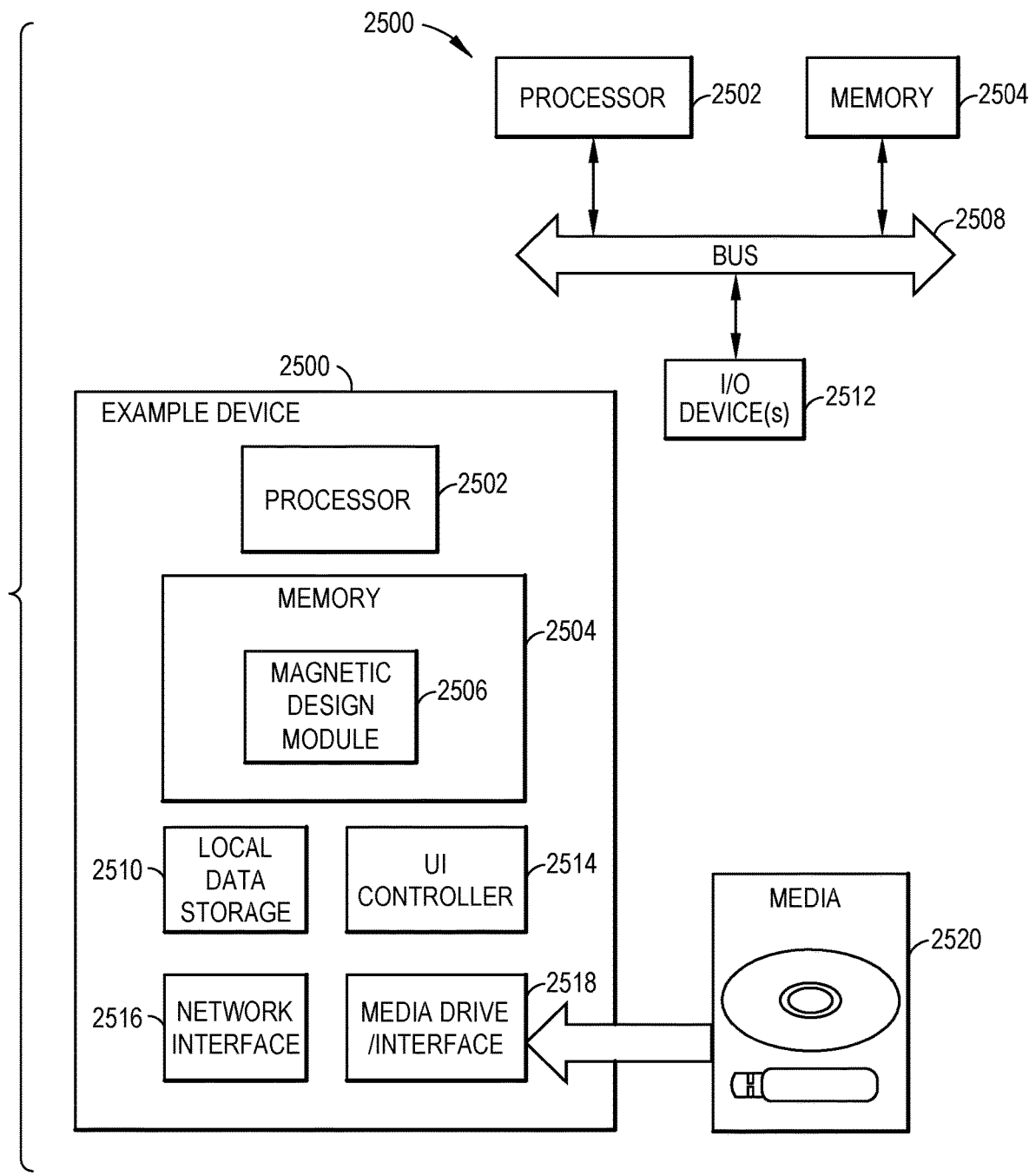
FIG. 13 is a functional block diagram of an exemplary computing device that can be used to embody parts of the active learning framework of the present disclosure.

FIG. 13 illustrates an example device 2500, with a processor 2502 and memory 2504 that can be configured to implement various embodiments of the active learning framework as discussed in this disclosure. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of a computer, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for machine learning for a machine-assisted inspection task comprising:
   collecting a set of unlabeled video data observations for object detection;

performing iterations of an active learning phase followed by a training phase, wherein:

performing each iteration of the active learning phase includes:

generating, with a plurality of machine learning components, a plurality of scores for an unlabeled observation of the set of unlabeled video data observations, wherein each machine learning component is configured to generate a different score, of the plurality of scores, for the unlabeled observation, wherein the plurality of scores includes an ensemble disparity score, wherein generating the ensemble disparity score comprises:

predicting, by each object detector of a plurality of object detectors of the plurality of machine learning components, a bounding box corresponding to a rectangular area in pixel space of a video frame of video data, the bounding box associated with one or more label classes;

predicting, by each object detector of the plurality of object detectors, a multi-class channel stack, each element in the multi-class channel stack corresponding to a pixel, a label class, and the object detector;

comparing the elements of the multi-class channel stacks of the plurality of object detectors to compute a disparity value; and generating the ensemble disparity score based on a weighted sum of the disparity value over the pixel space of the video frame;

inputting the unlabeled observation to a computation model of a primary machine learning component of the plurality of machine learning components;

predicting, with the computation model of the primary machine learning component, a label associated with the unlabeled observation, wherein the computation model of the primary machine learning component generates at least one uncertainty score, of the plurality of scores, associated with the predicted label, the plurality of scores further including at least one of: a relevance score for the unlabeled observation, a typicality score for the predicted label, or a density score for the unlabeled observation that characterizes a quality of the unlabeled observation or a quality of the predicted label;

using the plurality of scores to generate a composite score for the unlabeled observation; and using the composite score to control sampling of the unlabeled observation for a labeling process that generates and stores a ground truth label for the unlabeled observation; and performing each iteration of the training phase includes updating the plurality of machine learning components using the ground truth labels generated and stored by previous iterations of the active learning phase; and controlling the machine-assisted task based on labeled observations.

2. The method of claim 1, wherein the at least one uncertainty score characterizes at least one of: a confidence level for the associated predicted label or a reproducibility of the unlabeled observation.

3. The method of claim 1, wherein the composite score is based further on at least one of: the relevance score for the unlabeled observation, the typicality score for the unlabeled observation, or the density score for the unlabeled observation.

4. The method of claim 1, wherein the typicality score characterizes a level of divergence of the predicted label relative to a distribution of labels in a pool of labeled observations.

5. The method of claim 1, wherein the relevance score characterizes relevance or irrelevance of the unlabeled observation.

6. The method of claim 1, wherein the composite score is based further on the relevance score.

7. The method of claim 1, wherein the density score characterizes similarity of the unlabeled observation relative to a set of other observations.

8. The method of claim 1, wherein:

the sampling of the unlabeled observations employs a weighted ranking that is biased to sample informative observations for manual labeling by at least one human annotator, the informative observations have at least one of: a high relevance score or a high density score relative to other observations;

the informative observations result in the predicted label output by the primary machine learning component having a low typicality score relative to other observations; and the informative observations result in the predicted label output by the primary machine learning component having a high uncertainty score or low reproducibility relative to other observations.

9. The method of claim 1, wherein:

the sampling of the unlabeled observations employs a weighted ranking that is biased to sample confident observations for automatic labeling without human input;

the confident observations have at least one of a high relevance score or a high density score relative to other observations;

the confident observations results in the predicted label output by the primary machine learning component having a high typicality score relative to other observations; and the confident observations results in the predicted label output by the primary machine learning component having a low uncertainty score or a high reproducibility relative to other observations.

10. The method of claim 1, further comprising generating, with the plurality of machine learning components, predictions and scores associated with the labeled observations, wherein:

the scores associated with the labeled observations are used to control sampling of the labeled observations for a healing task; and the healing task includes at least one human annotator updating the ground truth label for an observation.

11. The method of claim 10, wherein:

the sampling of the labeled observations employs a weighted ranking that is biased to sample problematic observations for the healing task;

the problematic observations have at least one of a low relevance score or a low density score relative to other observations;

the problematic observations result in the predicted label output by the primary machine learning component having a low typicality score relative to other observations; and the problematic observations result in the predicted label output by the primary machine learning component having a high uncertainty score or a low reproducibility relative to other observations.

12. The method of claim 1, wherein:
a computational model of a relevance machine learning component that generates the relevance score comprises a convolutional neural network for binary classification;
the convolutional neural network has weights pre-trained on a database; and
performing each iteration of the training phase includes adjusting the weights of the convolutional neural network.

13. The method of claim 1, wherein a computational model of a typicality machine learning component that generates the typically score comprises a feature extractor and a one-class classifier.

14. The method of claim 1, wherein the primary machine learning component comprises at least one object detector machine learning component that is trained to generate at least one prediction related to at least one object within an input observation supplied thereto, and wherein the at least one object detector machine learning component generates at least one uncertainty score related to uncertainty of the at least one prediction related to the at least one object.

15. The method of claim 14, wherein the at least one object detector machine learning component comprises at least one convolutional neural network that is subject to pre-training on a database to configure initial weights for the at least one convolutional neural network.

16. The method of claim 15, wherein the pre-training configures anchors that describe sizes of characteristic objects to be detected by the at least one object detector machine learning component and that are used by the at least one convolutional neural network.

17. The method of claim 15, wherein performing each iteration of the training phase includes adjusting the initial weights of the at least one convolutional neural network of the at least one object detector machine learning component.

18. The method of claim 1, wherein collecting the set of unlabeled video data observations for object detection comprises collecting the video data via one or more sensors of an autonomous underwater vehicle (AUV), the video data associated with undersea inspection of oil and gas facilities, and wherein controlling the machine-assisted task includes controlling the AUV based on the object detection.

19. The method of claim 18, wherein collecting the set of unlabeled video data observations for object detection comprises:
obtaining, at a pre-processing component from an acquisition platform of the AUV, the video data;
extracting, by the pre-processing component, video frames from the video data as a set of unlabeled video observations;
filtering, by the pre-processing component, the set of unlabeled video observations to remove anomalous and duplicate observations from the set of unlabeled observations; and
adding, by the pre-processing component, the remaining unlabeled video observations of the set of unlabeled video observations to a pool of unlabeled video observations.

20. The method of claim 18, further comprising performing one or more post-processing steps at an edge component, wherein the one or more post-processing steps include at least one of:
compression of detected objects;
eventing based on the detected objects;
automatically logging detected anomalies based on the detected objects; or
geofencing by filtering out irrelevant labeled observations.

\* \* \* \* \*